United States Patent
Guccione et al.

(10) Patent No.: US 9,670,921 B2
(45) Date of Patent: Jun. 6, 2017

(54) RECIPROCATING DRIVE MECHANISM WITH A SPOOL VENT

(71) Applicant: Monkey Pumps, LLC, Harvey, LA (US)

(72) Inventors: Ray Guccione, Waggaman, LA (US); Richard Marcis, Kansas City, MO (US)

(73) Assignee: Monkey Pumps, LLC, Harvey, LA (US)

( * ) Notice: Subject to any disclaimer, the term of this patent is extended or adjusted under 35 U.S.C. 154(b) by 41 days.

(21) Appl. No.: 14/945,787

(22) Filed: Nov. 19, 2015

(65) Prior Publication Data
US 2017/0082100 A1   Mar. 23, 2017

Related U.S. Application Data

(63) Continuation-in-part of application No. 14/856,977, filed on Sep. 17, 2015.

(51) Int. Cl.
*F01B 31/08* (2006.01)
*F04B 49/22* (2006.01)
(Continued)

(52) U.S. Cl.
CPC .............. *F04B 49/22* (2013.01); *F04B 19/22* (2013.01); *F04B 53/10* (2013.01); *F16K 11/065* (2013.01); *F16K 27/04* (2013.01)

(58) Field of Classification Search
CPC ........... F04B 19/22; F04B 49/22; F04B 53/10
(Continued)

(56) References Cited

U.S. PATENT DOCUMENTS

| 817,538 A | 4/1906 | Wixon |
| 2,707,456 A | 5/1955 | Schweisthal |

(Continued)

FOREIGN PATENT DOCUMENTS

| CA | 1250182 A1 | 2/1989 |
| CN | 202901418 U | 4/2013 |
| WO | 03052270 A1 | 6/2003 |

OTHER PUBLICATIONS

Sidewinder Pumps Inc., Metering Pumps, catalog, United States http://sidewinderpumps.com.
(Continued)

*Primary Examiner* — Thomas E Lazo
*Assistant Examiner* — Daniel Collins
(74) *Attorney, Agent, or Firm* — Hankin Patent Law, APC; Kevin Schraven; Anooj Patel

(57) ABSTRACT

A reciprocating drive mechanism. The reciprocating drive mechanism may comprise: a spool assembly and a spool housing. The spool assembly may be reciprocally movable within a spool chamber of the spool housing. The spool housing may comprise a first seal, a second seal, and a third seal. When the spool assembly is within the spool chamber, the first seal, the second seal, and the third seal may divide the spool chamber into a distal chamber, an intermediate chamber, a supply chamber, and a proximal chamber, respectively. The spool assembly may comprise a first spool vent that is in fluid communication with the distal chamber. The spool housing may comprise a first housing vent that is in fluid communication with the intermediate chamber. The first spool vent may be in fluid communication with the first housing vent when an outlet of the first spool vent is aligned within the intermediate chamber.

20 Claims, 12 Drawing Sheets

(51) Int. Cl.
  *F16K 11/065* (2006.01)
  *F16K 27/04* (2006.01)
  *F04B 53/10* (2006.01)
  *F04B 19/22* (2006.01)

(58) Field of Classification Search
  USPC .......... 91/281; 137/625.66–625.69; 417/395
  See application file for complete search history.

(56) References Cited

U.S. PATENT DOCUMENTS

| | | | |
|---|---|---|---|
| 2,990,910 A | 7/1961 | Kimmell | |
| 3,318,251 A | 5/1967 | Smith | |
| 4,145,165 A | 3/1979 | Perkins | |
| 4,593,712 A | 6/1986 | Quartana, III | |
| 4,706,970 A | 11/1987 | Ramirez | |
| 4,776,773 A * | 10/1988 | Quartana, III | F04B 49/08 137/106 |
| 5,123,450 A | 6/1992 | Wood | |
| 5,144,882 A | 9/1992 | Weissgerber | |
| 5,173,036 A | 12/1992 | Fladby | |
| 5,263,404 A | 11/1993 | Gaucher | |
| 5,401,148 A | 3/1995 | Foster | |
| 5,468,127 A * | 11/1995 | Elliott | F01L 25/063 137/106 |
| 5,469,705 A | 11/1995 | Glenn, Jr. | |
| 5,788,745 A | 8/1998 | Hahn | |
| 5,794,442 A | 8/1998 | Lisniansky | |
| 5,992,856 A | 11/1999 | Balsells | |
| 6,006,949 A | 12/1999 | Foster | |
| 6,183,217 B1 | 2/2001 | Elliot et al. | |
| 6,279,471 B1 | 8/2001 | Reddoch | |
| 6,280,162 B1 | 8/2001 | Scheibel | |
| 6,398,514 B1 | 6/2002 | Smith | |
| 6,460,407 B1 | 10/2002 | Kato | |
| 6,736,046 B2 | 5/2004 | Elliott | |
| 7,458,309 B2 | 12/2008 | Simmons | |
| 7,640,841 B2 | 1/2010 | An | |
| 7,980,270 B2 | 7/2011 | Bertsch | |
| 8,087,345 B2 | 1/2012 | Singer | |
| 8,167,591 B1 | 5/2012 | Sorensen | |
| 8,201,580 B2 | 6/2012 | Tondolo | |
| 8,359,856 B2 | 1/2013 | McBride | |
| 8,387,574 B2 | 3/2013 | McCloy | |
| 8,733,102 B2 | 5/2014 | Quix | |
| 2004/0074383 A1 | 4/2004 | Elliot et al. | |
| 2005/0220642 A1 | 10/2005 | Uno | |
| 2012/0024407 A1 | 2/2012 | Kormanik | |
| 2013/0318955 A1 | 12/2013 | Zhang | |
| 2013/0343939 A1 | 12/2013 | Stoddard | |
| 2014/0123947 A1 | 5/2014 | Song | |
| 2014/0166139 A1 | 6/2014 | Watanabe | |
| 2014/0190162 A1 | 7/2014 | Fonseca | |
| 2014/0271252 A1 | 9/2014 | Vines | |

OTHER PUBLICATIONS

Sidewinder Pumps Inc., Pneumatic Powered Gas Recovery Metering Injection Pump, catalog, United States http://sidewinderpumps.com/gas-recovery.html.
Checkpoint Pumps & Systems, Gas Recovery (GR) Option, catalog, United States http://cppumps.com/GreenEnergy/GasRecoveryGROptions.aspx.
George E King Consulting, Chapter 5: Well Heads, Chokes and SSSVs, data sheet, United States http://gekengineering.com/Downloads/Free_Downloads/Well_Heads_Chokes_SSSV_Chapter_5.pdf.
Nandini Steel, Reducing Flanges, catalog, United States http://www.nspipefittings.com/reducing-flanges.html.
Ideal Vacuum Products, Conflat Flange (CF) Straight, Reducing Nipple, CF 8 inches to 6 inches Stainless Steel, catalog, United States http://www.pchemlabs.com/product.asp?pid=2221.
Bruin Pumps, BRX3 Pneumatically Operated Chemical Injection Pump, catalog, United States http://www.bruinpumps.com/brx3.htm.
Korean Intellectual Property Office; Patent Cooperation Treaty International Search Report; Jan. 6, 2017.
Korean Intellectual Property Office; Written Opinion of the International Searching Authority; Jan. 6, 2017.

\* cited by examiner

RECIPROCATING DRIVE MECHANISM WITH A SPOOL VENT

CROSS-REFERENCE TO RELATED APPLICATIONS

This Application is a continuation-in-part of U.S. Non-Provisional patent application Ser. No. 14/856,977, filed on Sep. 17, 2015, titled "Zero Emission Reciprocating Drive Pump", by inventors Ray Guccione and Richard Marcis, the contents of which are expressly incorporated herein by this reference, and to which priority is claimed.

FIELD OF USE

The present disclosure relates generally to control valves and reciprocating drive mechanisms, and more specifically, to reciprocating drive mechanisms with control valves such as injection pumps adapted to selectively change the directional flow of fluids for a piston.

BACKGROUND

Reciprocating drive mechanisms such as injection pumps and pneumatic pumps may be used to transport fluids, liquids, and/or gases and are generally used in various applications, such as manufacturing process control, hydraulic systems, and the like. The control valve of a reciprocating drive mechanism may comprise a spool valve coupled to piston. As a spool shifts between a first position and second position, control fluid may be selectively communicated between various ports and lines for pressurized movement of the piston. This pressurized movement preferably creates a pumping action of the piston through a repetitive series of motions.

U.S. Pat. No. 4,776,773, issued to Anthony J. Quartana, III ("Quartana"), for example, discloses a pilot control valve for changing the directional flow of fluid to a piston. The Quartana reference discloses a valve member or spool disposed within the upper housing. The spool is coupled to a piston via a valve stem and includes slide valves that are loosely mounted on the sides of the spool. The slide valves may shift between a first and second position on the spool and are used for selective communication of the control fluid. For example, when the slide valves are in the first position, the slide valves allow communication of the control fluid from the upper housing to the lower surface of the piston. As the slide valves move to their second position, they allow communication of the pressurized control fluid to the upper surface of the piston, thereby causing the piston to return to its first position. The Quartana control valve also includes an exhaust port located on the side of the housing for the release of fluid or air buildup behind the spool.

Unfortunately, these reciprocating pumps, especially the Quartana control valve, generally have a shorter spool design, which limits the stroke of the piston and spool to approximately 1-2 inches. Thus, these reciprocating drive mechanisms are not designed with the longer strokes because air buildup generally occurs behind the spool, thereby causing the pump to stall. Specifically, with each iteration of motion by the piston and spool, air is inadvertently forced behind the area of the spool due to the longer strokes. This air may be trapped and unable to escape, leading to air buildup, which can interfere with the operation of the pump. The trapped air may cause the pump to stall, possibly causing the pump to become inoperable and unreliable.

Therefore, there is a need for a new and improved reciprocating drive mechanism capable of performing longer strokes (e.g., at least four inches) while preventing air buildup behind the spool.

SUMMARY OF EMBODIMENTS

To minimize the limitations in the prior art, and to minimize other limitations that will become apparent upon reading and understanding the present disclosure, the present specification discloses a new and improved reciprocating drive pump with a spool vent.

One embodiment may be a reciprocating drive mechanism, comprising: a spool assembly; and a spool housing; wherein the spool housing may comprise a spool chamber; wherein the spool assembly may be disposed in and reciprocally movable within the spool chamber; wherein the spool housing may comprise a first seal, a second seal, and a third seal; wherein, when the spool assembly is disposed within the spool chamber of the spool housing, the first seal, the second seal, and the third seal may divide the spool chamber into a distal chamber, an intermediate chamber, a supply chamber, and a proximal chamber, respectively, such that: (i) the first seal may divide the spool chamber into the distal chamber and the intermediate chamber; (ii) the second seal may divide the spool chamber into the intermediate chamber and the supply chamber; and (iii) the third seal may divide the spool chamber into the supply chamber and the proximal chamber; wherein the spool assembly may comprise a first spool vent; wherein the first spool vent may be in fluid communication with the distal chamber; wherein the spool housing may comprise a first housing vent having an inlet and an outlet; wherein an inlet of the first housing vent may be in fluid communication with the intermediate chamber; and wherein the first spool vent may be in fluid communication with the first housing vent when the spool assembly reciprocates within the spool housing and aligns an outlet of the first spool vent within the intermediate chamber, such that a fluid trapped within the distal chamber may be allowed to escape the distal chamber and into the intermediate chamber to the first housing vent. The spool housing may further comprise a first exhaust port; wherein the spool assembly may further comprise a first slide valve; wherein the first slide valve may be coupled to an outer perimeter of the spool assembly; wherein the first exhaust port may be positioned proximally and adjacent to the outlet of the first housing vent; wherein, as the spool assembly moves towards a distal end of the spool housing during an upstroke, a first internal valve space of the first slide valve may align with an outlet of the first housing vent and the first exhaust port so as to allow the fluid within the first housing vent to communicate through the first internal valve space of the first slide valve and the first exhaust port; and wherein, as the spool assembly moves towards a proximal end of the spool housing during a downstroke, at least a portion of the first slide valve may block the outlet of the first housing vent so as to prevent the fluid within the first housing vent to communicate through the first internal valve space of the first slide valve and the first exhaust port. The spool housing may further comprise a second housing vent; wherein the second housing vent may be proximal and adjacent to the first exhaust port and may comprise an inlet and an outlet; wherein the inlet of the second housing vent may be in fluid communication with the proximal chamber and wherein the outlet of the second housing vent may be in fluid communication with the supply chamber; wherein, as the spool assembly moves towards the distal end of the spool housing during an upstroke, the outlet of the second housing vent may be in fluid communication with the supply chamber, such that the proximal chamber is in fluid communication with the supply chamber; and wherein, as the spool assembly moves towards the proximal end of the spool housing during a downstroke, the first internal valve space of the first slide valve may align with the outlet of the second housing vent and the first exhaust port, so as to allow the fluid within the second housing vent and the proximal chamber to communicate through the first internal valve space of the first slide valve and the first exhaust port. The spool housing may further comprise: a first fluid port, a second fluid port, and a second exhaust port; wherein the second exhaust port may be positioned proximally and adjacent to the first fluid port; wherein the second fluid port may be positioned proximally and adjacent to the second exhaust port; wherein the first fluid port and the second fluid port may be in fluid communication with the supply chamber; wherein the spool assembly may comprise a second slide valve coupled to an outer perimeter of the spool assembly; wherein, as the spool assembly moves towards the distal end of the spool housing during the upstroke: (i) a second internal valve space of the second slide valve may align with the first fluid port and the second exhaust port so as to allow the fluid within the first fluid port to communicate through the second internal valve space of the second slide valve and through the second exhaust port; and (ii) the second fluid port may be in fluid communication with the supply chamber, so as to prevent the fluid in the second fluid port to communicate through the second internal valve space and the second exhaust port; wherein, as the spool assembly moves towards the proximal end of the spool housing during the downstroke: (i) the second internal valve space of the second slide valve may align with the second fluid port and the second exhaust port so as to allow the fluid within the second fluid port to communicate through the second internal valve space of the second slide valve and through the second exhaust port; and (ii) the first fluid port may be in fluid communication with the supply chamber, so as to prevent the fluid in the first fluid port to communicate through the second internal valve space and the second exhaust port. The spool assembly may comprise a center bore; wherein the center bore of the spool assembly may be in fluid communication with the distal chamber; wherein, when a pressurized fluid travels from the center bore and towards the distal chamber, the spool assembly may perform the downstroke. The reciprocating drive mechanism may further comprise: a piston housing; a piston; and a valve stem; wherein the piston housing may comprise a top flange, a bottom flange, and a cylindrical side wall; wherein the top flange, the bottom flange, and the cylindrical side wall may form a piston chamber; wherein the piston may be reciprocally movable within the piston chamber and may divide the piston chamber into a first cylindrical space and a second cylindrical space; wherein a proximal portion of the valve stem may be connected to the piston; wherein a distal portion of the valve stem may be configured to slideably and reciprocally engage within the center bore of the spool assembly; wherein the valve stem may comprise a valve stem bore and at least one passage; wherein the valve stem bore and the at least one passage may be in fluid communication with the center bore of the spool assembly, such that the valve stem bore and the at least one passage may be in fluid communication with the distal chamber; wherein the top flange may comprise a valve stem opening and a fourth seal disposed within the valve stem opening; wherein the fourth seal may be slideably engaged with the valve stem; and wherein, when the at least one passage is exposed within the first cylindrical space after the piston moves towards the bottom flange and shifts the at least one passage of the valve stem within the first cylindrical space, the valve stem bore may be in fluid communication with the first cylindrical space. The reciprocating drive mechanism may further comprise: a first fluid conduit; and a second fluid conduit; wherein the first fluid conduit may be coupled between the first fluid port and the bottom flange of the piston housing; wherein the first fluid conduit may allow the first fluid port to be in fluid communication with the first cylindrical space; wherein the second fluid conduit may be coupled between the second fluid port and the top flange of the piston housing; and wherein the second fluid conduit may allow the second fluid port to be in fluid communication with the second cylindrical space. The spool assembly may comprise a second spool vent having an inlet and an outlet; wherein an inlet of the second spool vent may be in fluid communication with the distal chamber; wherein the outlet of the second spool vent may be located at an outer perimeter of the spool assembly; wherein an outlet of the second spool vent may be configured to be in fluid communication with the first housing vent when the spool assembly reciprocates within the spool housing and aligns the outlet of the first spool vent within the intermediate chamber, such that a fluid trapped within the distal chamber may be allowed to escape the distal chamber and into the intermediate chamber to the first housing vent via the second spool vent. The fluid may be a gas.

Another embodiment may be a reciprocating drive mechanism, comprising: a spool assembly; and a spool housing; wherein the spool housing may comprise a spool chamber; wherein the spool assembly may be disposed in and reciprocally movable within the spool chamber; wherein the spool housing may comprise a first seal, a second seal, and a third seal; wherein, when the spool assembly is disposed within the spool chamber of the spool housing, the first seal, the second seal, and the third seal may divide the spool chamber into a distal chamber, an intermediate chamber, a supply chamber, and a proximal chamber, respectively, such that: (i) the first seal may divide the spool chamber into the distal chamber and the intermediate chamber; (ii) the second seal may divide the spool chamber into the intermediate chamber and the supply chamber; and (iii) the third seal may divide the spool chamber into the supply chamber and the proximal chamber; wherein the spool assembly may comprise a first spool vent having an inlet and an outlet; wherein the inlet of the first spool vent may be in fluid communication with the distal chamber and wherein the outlet of the first spool vent may be located at an outer perimeter of the spool assembly; wherein the spool housing may comprise a first housing vent having an inlet and an outlet; wherein an inlet of the first housing vent may be in fluid communication with the intermediate chamber and wherein the outlet of the first housing vent may be in fluid communication with the supply chamber; and wherein the first spool vent may be in fluid communication with the first housing vent when the spool assembly reciprocates within the spool housing and aligns the outlet of the first spool vent within the intermediate chamber, such that a fluid trapped within the distal chamber may be allowed to escape the distal chamber and into the intermediate chamber to the first housing vent. The spool housing may further comprise a first exhaust port; wherein the spool assembly may further comprise a first slide valve; wherein the first slide valve may be coupled to an outer perimeter of the spool assembly; wherein the first exhaust port may be positioned proximally and adjacent to the outlet of the first housing vent; wherein, as the spool assembly moves towards a distal end of the spool housing during an upstroke, a first internal valve space of the first slide valve may align with an outlet of the first housing vent and the first exhaust port so as to allow the fluid within the first housing vent to communicate through the first internal valve space of the first slide valve and the first exhaust port; and wherein, as the spool assembly moves towards a proximal end of the spool housing during a downstroke, at least a portion of the first slide valve may block the outlet of the first housing vent so as to prevent the fluid within the first housing vent to communicate through the first internal valve space of the first slide valve and the first exhaust port. The spool housing may further comprise a second housing vent; wherein the second housing vent may be proximal and adjacent to the first exhaust port and comprises an inlet and an outlet; wherein the inlet of the second housing vent may be in fluid communication with the proximal chamber and wherein the outlet of the second housing vent may be in fluid communication with the supply chamber; wherein, as the spool assembly moves towards the distal end of the spool housing during an upstroke, the outlet of the second housing vent may be in fluid communication with the supply chamber, such that the proximal chamber is in fluid communication with the supply chamber; and wherein, as the spool assembly moves towards the proximal end of the spool housing during a downstroke, the first internal valve space of the first slide valve may align with the outlet of the second housing vent and the first exhaust port, so as to allow the fluid within the second housing vent and the proximal chamber to communicate through the first internal valve space of the first slide valve and the first exhaust port. The spool housing may further comprise: a first fluid port, a second fluid port, and a second exhaust port; wherein the second exhaust port may be positioned proximally and adjacent to the first fluid port; wherein the second fluid port may be positioned proximally and adjacent to the second exhaust port; wherein the first fluid port and the second fluid port may be in fluid communication with the supply chamber; wherein the spool assembly may comprise a second slide valve coupled to an outer perimeter of the spool assembly; wherein, as the spool assembly moves towards the distal end of the spool housing during the upstroke: (i) a second internal valve space of the second slide valve may align with the first fluid port and the second exhaust port so as to allow the fluid within the first fluid port to communicate through the second internal valve space of the second slide valve and to the second exhaust port; and (ii) the second fluid port may be in fluid communication with the supply chamber, so as to prevent the fluid in the second fluid port to communicate through the second internal valve space and the second exhaust port; wherein, as the spool assembly moves towards the proximal end of the spool housing during the downstroke: (i) the second internal valve space of the second slide valve may align with the second fluid port and the second exhaust port so as to allow the fluid within the second fluid port to communicate through the second internal valve space of the second slide valve and to the second exhaust port; and (ii) the first fluid port may be in fluid communication with the supply chamber, so as to prevent the fluid in the first fluid port to communicate through the second internal valve space and the second exhaust port. The spool assembly may comprise a center bore; wherein the center bore of the spool assembly may be in fluid communication with the distal chamber; wherein, when a pressurized fluid travels from the center bore and towards the distal chamber, the spool assembly may perform the downstroke. The reciprocating drive mechanism may further comprise: a piston housing; a piston; and a valve stem; wherein the piston housing may comprise a top flange, a bottom flange, and a cylindrical side wall; wherein the top flange, the bottom flange, and the cylindrical side wall may form a piston chamber; wherein the piston may be reciprocally movable within the piston chamber and may divide the piston chamber into a first cylindrical space and a second cylindrical space; wherein a proximal portion of the valve stem may be connected to the piston; wherein a distal portion of the valve stem may be configured to slideably and reciprocally engage within the center bore of the spool assembly; wherein the valve stem may comprise a valve stem bore and at least one passage; wherein the valve stem bore and the at least one passage may be in fluid communication with the center bore of the spool assembly, such that the valve stem bore and the at least one passage of the valve stem may be in fluid communication with the distal chamber; wherein the top flange may comprise a valve stem opening and a fourth seal disposed within the valve stem opening; wherein the fourth seal may be slideably engaged with the valve stem; and wherein, when the at least one passage is exposed within the first cylindrical space after the piston moves towards the bottom flange and shifts the at least one passage of the valve stem within the first cylindrical space, the valve stem bore of the valve stem may be in fluid communication with the first cylindrical space. The reciprocating drive mechanism may further comprise: a first fluid conduit; and a second fluid conduit; wherein the first fluid conduit may be coupled between the first fluid port and the bottom flange of the piston housing; wherein the first fluid conduit may allow the first fluid port to be in fluid communication with the first cylindrical space; wherein the second fluid conduit may be coupled between the second fluid port and the top flange of the piston housing; and wherein the second fluid conduit may allow the second fluid port to be in fluid communication with the second cylindrical space. The spool assembly may comprise a second spool vent having an inlet and an outlet; wherein an inlet of the second spool vent may be in fluid communication with the distal chamber; wherein the outlet of the second spool vent may be located at an outer perimeter of the spool assembly; and wherein an outlet of the second spool vent may be configured to be in fluid communication with the first housing vent when the spool assembly reciprocates within the spool housing and aligns the outlet of the second spool vent within the intermediate chamber, such that a fluid trapped within the distal chamber may be allowed to escape the distal chamber and into the intermediate chamber to the first housing vent via the second spool vent. The fluid may be a gas.

Another embodiment may be a reciprocating drive mechanism, comprising: a spool assembly; a spool housing; a piston housing; a piston; a valve stem; a first fluid conduit; and a second fluid conduit; wherein the spool assembly may comprise: a first seal, a second seal, a third seal, a first spool vent and first slide valve; wherein the spool housing may comprise: a spool chamber, a first exhaust port, a second exhaust port, a first fluid port, and a second fluid port; wherein the spool assembly may be disposed in and reciprocally movable within the spool chamber; wherein, when the spool assembly is disposed within the spool chamber of the spool housing, the first seal, the second seal, and the third seal may divide the spool chamber into a distal chamber, an intermediate chamber, a supply chamber, and a proximal chamber, respectively, such that: (1) the first seal may divide the spool chamber into the distal chamber and the intermediate chamber; (ii) the second seal may divide the spool chamber into the intermediate chamber and the supply chamber; and (iii) the third seal may divide the spool chamber into the supply chamber and the proximal chamber; wherein the first spool vent may comprise an inlet and an outlet; wherein the inlet of the first spool vent may be in fluid communication with the distal chamber; wherein the outlet of the first spool vent may be located at an outer perimeter of the spool assembly and may be in fluid communication with the intermediate chamber; wherein the spool housing may comprise a first housing vent having an inlet and an outlet; wherein an inlet of the first housing vent may be in fluid communication with the intermediate chamber when the inlet of the first housing vent aligns with the intermediate chamber; wherein the outlet of the first housing vent may be in fluid communication with the supply chamber; wherein the first spool vent may be in fluid communication with the first housing vent when the spool assembly reciprocates within the spool housing and aligns the inlet of the first housing vent within the intermediate chamber, such that a fluid trapped within the distal chamber may be allowed to escape the distal chamber, through the spool vent, through the intermediate chamber, and to the first housing vent; wherein the first exhaust port may be positioned proximally and adjacent to the outlet of the first housing vent; wherein the second housing vent may be proximal and adjacent to the first exhaust port and may comprise an inlet and an outlet; wherein the inlet of the second housing vent may be in fluid communication with the proximal chamber and wherein the outlet of the second housing vent may be in fluid communication with the supply chamber; wherein, as the spool assembly moves towards a distal end of the spool housing during an upstroke: (i) the outlet of the second housing vent may be in fluid communication with the supply chamber, such that the proximal chamber is in fluid communication with the supply chamber; and (ii) a first internal valve space of the first slide valve may align with an outlet of the first housing vent and the first exhaust port so as to allow the fluid within the first housing vent to communicate through the internal valve space of the first slide valve and the first exhaust port; wherein, as the spool assembly moves towards a proximal end of the spool housing during a downstroke: (i) the first internal valve space of the first slide valve may align with the outlet of the second housing vent and the first exhaust port, so as to allow the fluid within the second housing vent and the proximal chamber to communicate through the first internal valve space of the first slide valve and the first exhaust port; and (ii) at least a portion of the first slide valve may block the outlet of the first housing vent so as to prevent the fluid within the first housing vent to communicate through the first internal valve space of the first slide valve and the first exhaust port; wherein the second exhaust port may be positioned proximally and adjacent to the first fluid port; wherein the second fluid port may be positioned proximally and adjacent to the second exhaust port; wherein the first fluid port and the second fluid port may be in fluid communication with the supply chamber; wherein the spool assembly may comprise a second slide valve coupled to an outer perimeter of the spool assembly; wherein, as the spool assembly moves towards the distal end of the spool housing during the upstroke: (i) a second internal valve space of the second slide valve may align with the first fluid port and the second exhaust port so as to allow the fluid within the first fluid port to communicate through the second internal valve space of the second slide valve and to the second exhaust port; and (ii) the second fluid port may be in fluid communication with the supply chamber, so as to prevent the fluid in the second fluid port to communicate through the second internal valve space and the second exhaust port; wherein, as the spool assembly moves towards the proximal end of the spool housing during the downstroke: (i) a second internal valve space of the second slide valve may align with the second fluid port and the second exhaust port so as to allow the fluid within the second fluid port to communicate through the second internal valve space of the second slide valve and to the second exhaust port; and (ii) the first fluid port may be in fluid communication with the supply chamber, so as to prevent the fluid in the first fluid port to communicate through the second internal valve space and the second exhaust port; wherein the piston housing may comprise a top flange, a bottom flange, and a cylindrical side wall; wherein the top flange, the bottom flange, and the cylindrical side walls may form a piston chamber; wherein the piston may be reciprocally movable within the piston chamber and may divide the piston chamber into a first cylindrical space and a second cylindrical space; wherein a proximal portion of the valve stem may be connected to the piston; wherein a distal portion of the valve stem may be configured to slideably and reciprocally engage within a center bore of the spool assembly; wherein the center bore of the spool assembly may be in fluid communication with the distal chamber of the spool housing; wherein, when a pressurized fluid travels from the center bore and towards the distal chamber, the spool assembly may perform the downstroke; wherein the valve stem may comprise a valve stem bore and at least one passage; wherein the valve stem bore and the at least one passage may be in fluid communication with the center bore of the spool assembly, such that the valve stem bore and the at least one passage of the valve stem are in fluid communication with the distal chamber; wherein the top flange may comprise a valve stem opening and a fourth seal disposed within the valve stem opening; wherein the fourth seal may be slideably engaged with the valve stem; wherein, when the at least one passage is exposed within the first cylindrical space after the piston moves towards the bottom flange and shifts the at least one passage of the valve stem within the first cylindrical space, the valve stem bore of the valve stem may be in fluid communication with the first cylindrical space; wherein the first fluid conduit may be coupled between the first fluid port and the bottom flange of the piston housing; wherein the first fluid conduit may allow the first fluid port to be in fluid communication with the first cylindrical space; wherein the second fluid conduit may be coupled between the second fluid port and the top flange of the piston housing; and wherein the second fluid conduit may allow the second fluid port to be in fluid communication with the second cylindrical space. The spool assembly may comprise a second spool vent having an inlet and an outlet; wherein an inlet of the second spool vent may be in fluid communication with the distal chamber; wherein an outlet of the second spool vent may be located at an outer perimeter of the spool assembly; and wherein an outlet of the second spool vent may be in fluid communication with the first housing vent when the spool assembly reciprocates within the spool housing and aligns the inlet of the first housing vent within the intermediate chamber, such that a fluid trapped within the distal chamber is allowed to escape the distal chamber and into the intermediate chamber to the first housing vent via the second spool vent.

Another embodiment may be a reciprocating drive mechanism, comprising: a spool assembly; a spool housing; a piston housing; a piston; a valve stem; a first fluid conduit; and a second fluid conduit; wherein the spool housing may comprise: a spool chamber; a first seal, a second seal, a third seal, a first exhaust port, a second exhaust port, a first fluid port, and a second fluid port; wherein the spool assembly may be disposed in and reciprocally movable within the spool chamber; wherein, when the spool assembly is disposed within the spool chamber of the spool housing, the first seal, the second seal, and the third seal may divide the spool chamber into a distal chamber, an intermediate chamber, a supply chamber, and a proximal chamber, respectively, such that: (i) the first seal may divide the spool chamber into the distal chamber and the intermediate chamber; (ii) the second seal may divide the spool chamber into the intermediate chamber and the supply chamber; and (iii) the third seal may divide the spool chamber into the supply chamber and the proximal chamber; wherein the spool assembly may comprise a first spool vent and first slide valve; wherein the first spool vent may comprise an inlet and an outlet; wherein the inlet of the first spool vent may be in fluid communication with the distal chamber and wherein the outlet of the first spool vent may be located at an outer perimeter of the spool assembly; wherein the spool housing may comprise a first housing vent having an inlet and an outlet; wherein an inlet of the first housing vent may be in fluid communication with the intermediate chamber and wherein the outlet of the first housing vent may be in fluid communication with the supply chamber; wherein the first spool vent may be in fluid communication with the first housing vent when the spool assembly reciprocates within the spool housing and aligns the outlet of the first spool vent within the intermediate chamber, such that a fluid trapped within the distal chamber may be allowed to escape the distal chamber, through the spool vent, through the intermediate chamber, and to the first housing vent; wherein the first exhaust port may be positioned proximally and adjacent to the outlet of the first housing vent; wherein the second housing vent may be proximal and adjacent to the first exhaust port and comprises an inlet and an outlet; wherein the inlet of the second housing vent may be in fluid communication with the proximal chamber and wherein the outlet of the second housing vent may be in fluid communication with the supply chamber; wherein, as the spool assembly moves towards a distal end of the spool housing during an upstroke: (i) the outlet of the second housing vent may be in fluid communication with the supply chamber, such that the proximal chamber is in fluid communication with the supply chamber; and (ii) a first internal valve space of the first slide valve may align with an outlet of the first housing vent and the first exhaust port so as to allow the fluid within the first housing vent to communicate through the internal valve space of the first slide valve and the first exhaust port; wherein, as the spool assembly moves towards a proximal end of the spool housing during a downstroke: (i) the first internal valve space of the first slide valve may align with the outlet of the second housing vent and the first exhaust port, so as to allow the fluid within the second housing vent and the proximal chamber to communicate through the first internal valve space of the first slide valve and the first exhaust port; and (ii) at least a portion of the first slide valve may block the outlet of the first housing vent so as to prevent the fluid within the first housing vent to communicate through the first internal valve space of the first slide valve and the first exhaust port; wherein the second exhaust port may be positioned proximally and adjacent to the first fluid port; wherein the second fluid port may be positioned proximally and adjacent to the second exhaust port; wherein the first fluid port and the second fluid port may be in fluid communication with the supply chamber; wherein the spool assembly may comprise a second slide valve coupled to an outer perimeter of the spool assembly; wherein, as the spool assembly moves towards the distal end of the spool housing during the upstroke: (i) a second internal valve space of the second slide valve may align with the first fluid port and the second exhaust port so as to allow the fluid within the first fluid port to communicate through the second internal valve space of the second slide valve and to the second exhaust port; and (ii) the second fluid port may be in fluid communication with the supply chamber, so as to prevent the fluid in the second fluid port to communicate through the second internal valve space and the second exhaust port; wherein, as the spool assembly moves towards the proximal end of the spool housing during the downstroke: (i) a second internal valve space of the second slide valve may align with the second fluid port and the second exhaust port so as to allow the fluid within the second fluid port to communicate through the second internal valve space of the second slide valve and to the second exhaust port; and (ii) the first fluid port may be in fluid communication with the supply chamber, so as to prevent the fluid in the first fluid port to communicate through the second internal valve space and the second exhaust port; wherein the piston housing may comprise a top flange, a bottom flange, and a cylindrical side wall; wherein the top flange, the bottom flange, and the cylindrical side walls may form a piston chamber; wherein the piston may be reciprocally movable within the piston chamber and may divide the piston chamber into a first cylindrical space and a second cylindrical space; wherein a proximal portion of the valve stem may be connected to the piston; wherein a distal portion of the valve stem may be configured to slideably and reciprocally engage within a center bore of the spool assembly; wherein the center bore of the spool assembly may be in fluid communication with the distal chamber of the spool housing; wherein, when a pressurized fluid travels from the center bore and towards the distal chamber, the spool assembly may perform the downstroke; wherein the valve stem comprises a valve stem bore and at least one passage; wherein the valve stem bore and the at least one passage may be in fluid communication with the center bore of the spool assembly, such that the valve stem bore and the at least one passage of the valve stem may be in fluid communication with the distal chamber; wherein the top flange may comprise a valve stem opening and a fourth seal disposed within the valve stem opening; wherein the fourth seal may be slideably engaged with the valve stem; wherein, when the at least one passage is exposed within the first cylindrical space after the piston moves towards the bottom flange and shifts the at least one passage of the valve stem within the first cylindrical space, the valve stem bore of the valve stem may be in fluid communication with the first cylindrical space; wherein the first fluid conduit may be coupled between the first fluid port and the bottom flange of the piston housing; wherein the first fluid conduit may allow the first fluid port to be in fluid communication with the first cylindrical space; wherein the second fluid conduit may be coupled between the second fluid port and the top flange of the piston housing; and wherein the second fluid conduit may allow the second fluid port to be in fluid communication with the second cylindrical space. The spool assembly may comprise a second spool vent having an inlet and an outlet; wherein an inlet of the second spool vent may be in fluid communication with the distal chamber; wherein an outlet of the second spool vent may be located at an outer perimeter of the spool assembly; and wherein an outlet of the second spool vent may be configured to be in fluid communication with the first housing vent when the spool assembly reciprocates within the spool housing and aligns the outlet of the first spool vent within the intermediate chamber, such that a fluid trapped within the distal chamber may be allowed to escape the distal chamber and into the intermediate chamber to the first housing vent via the second spool vent.

It is an object to provide a reciprocating drive mechanism with one or more spool vents. Preferably the spool vent is a vent located in the spool assembly and preferably allows trapped air inside the pump to exit into the atmosphere.

It is an object to provide a design enhancement to a reciprocating drive mechanism, typically used as a fluid pump. The nature of standard pump designs generally limits the length of the spool. The new design disclosed herein preferably does not limit stroke length, which is directly related to how much fluid volume the reciprocating mechanism can pump.

It is an object to provide a new reciprocating drive pump that creates longer stroking pumps and which will allow air behind a spool to escape. Preferably, the new reciprocating drive pump provides a path that allows air to escape to the atmosphere, thereby providing smoother strokes.

It is an object to provide a reciprocating drive mechanism that performs strokes at least three to four inches.

It is an object to provide a spool housing and spool assembly that forms or comprises a vent from the distal chamber within the housing assembly to the outside of the reciprocating drive mechanism to release air trapped at the end of the spool. In one embodiment, the vents of the housing assembly and spool assembly may be aligned when the spool assembly forms a distal chamber of approximately 0.110 inches from the distal end of the housing assembly to the distal end of the spool assembly.

It is an object to provide a reciprocating drive mechanism that allows air to exit one or more internal chambers of the reciprocating drive mechanism without increasing the wear on the seals of the reciprocating drive mechanism.

It is an object to provide a reciprocating drive mechanism that allows for a reciprocating drive fluid pump to have a spool of any length.

It is an object to overcome the deficiencies of the prior art.

These, as well as other components, steps, features, objects, benefits, and advantages, will now become clear from a review of the following detailed description of illustrative embodiments, of the accompanying drawings, and of the claims.

BRIEF DESCRIPTION OF THE ILLUSTRATIVE EMBODIMENTS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE ILLUSTRATIVE EMBODIMENTS

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the terms "reciprocating drive mechanism", "pump", and "drive pump", as used herein, refer to any mechanical device that raises, transfers, delivers, or compresses fluids or that attenuates gases especially by suction or pressure or both.

As used herein, the terms "approximately" and "about" generally refer to a deviance of within 5% of the indicated number or range of numbers. In one embodiment, the term "approximately" and "about", refer to a deviance of between 1-10% from the indicated number or range of numbers.

Figure 1:
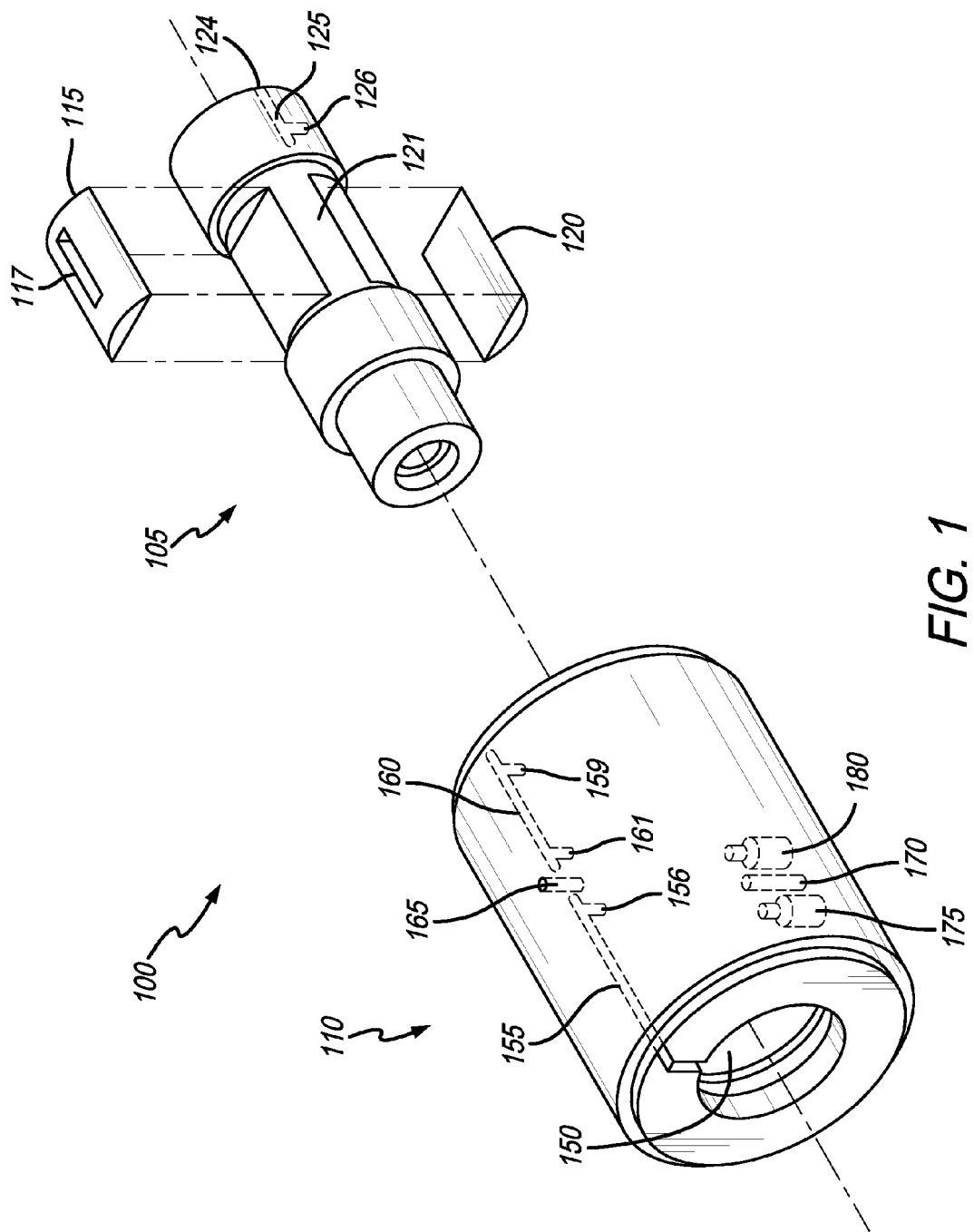
FIG. 1 is an illustration of an exploded view of one embodiment of the spool valve.

FIG. 1 is an illustration of an exploded view of one embodiment of the spool valve. As shown in FIG. 1, one embodiment of the spool valve 100 may comprise: a spool assembly 105 and a spool housing 110. The spool assembly 105 may comprise a spool body 121, a first slide valve 115, a second slide valve 120, and a spool vent 125. The spool housing 110 may comprise a spool chamber 150, a first housing vent 160, a second housing vent 155, a first exhaust port 165, a second exhaust port 170, a first fluid port 180, and a second fluid port 175.

The spool housing 110 is preferably a structure that houses or contains the spool assembly 105 within a spool chamber 150. The spool assembly 105 is a structure (preferably cylindrical) that is configured to move back and forth in a reciprocating manner, so as to control the flow of fluid, such as a liquid or a gas within the reciprocating drive mechanism 1000 (shown in FIGS. 3A-G). The spool vent 125, first housing vent 160, second housing vent 155, first fluid port 180, and second fluid port 175 are preferably openings that serve as inlets and/or outlets for fluid, liquid, and/or gases within the spool valve 100 (i.e., spool assembly 105 and spool housing 110). Similarly, the first slide valve 115 and second slide valve 120 are preferably rectilinear valves used to control the emission of fluid, liquid, and/or gas from the reciprocating drive pump 100. In a preferred embodiment, slide valves 115, 120 are preferably D-slide valves with a curved outer perimeter, each of which having an internal valve space 117, 118 (shown in FIG. 2). Specifically, first slide valve 115 preferably has an internal valve space 117, and second slide valve 120 has an internal valve space 118. Although FIG. 1 shows a spool valve 100 with a single spool vent 125, multiple spool vents may also be used.

In one embodiment, the spool vent 125 may traverse from a distal end of the spool assembly 105 to an outer perimeter surface of the spool assembly 105. The housing vents 155, 160 may traverse within the inner wall of the spool housing 110 and towards a middle area of the inner wall. Specifically, first housing vent 160 may traverse from the distal end of the spool housing 110 and towards a middle area of the inner wall, whereas second housing vent 155 may traverse from the proximal end of the spool housing 110 and towards a middle area of the inner wall. Preferably, the first internal valve space 117 of first slide valve 115 may provide a temporary and one-way passageway for the outlet 156 of second housing vent 155 and the outlet 161 of first housing vent 160. Preferably, the distal end of the spool chamber 150 and outer machining of the spool assembly 105 are plugged via seals (shown in FIGS. 2A, 2B) to isolate the paths from distal chamber 201 and the atmosphere.

In one embodiment, the housing vents 155, 160, exhaust port 165, and slide valve 115 are located within a relatively short distance from one another within the spool valve 100. This preferably allows the outlets, 156, 161 of housing vents 155, 160, exhaust port 165, and first internal valve space 117 of the first slide valve 115 to align in close proximity with each other as the spool assembly 105 moves to a certain position within the spool housing 110 during the reciprocating upstroke or downstroke motion of the spool assembly 105. Similarly, in one embodiment, fluid ports 175, 180, exhaust port 170, and slide valve 120 are also located within a relatively short distance from one another within the spool valve 100. This also preferably allows the fluid ports 175, 180, exhaust port 170, and second internal valve space 118 of the second slide valve 120 to align in close proximity with each other as the spool assembly 105 moves to a certain position within the spool housing 110 during the reciprocating upstroke or downstroke motion of the spool assembly 105. This may also allow the fluid communicating through fluid ports 175, 180 to access to the outside or exterior portion of the spool housing 110 via the exhaust port 170.

Figure 2A:
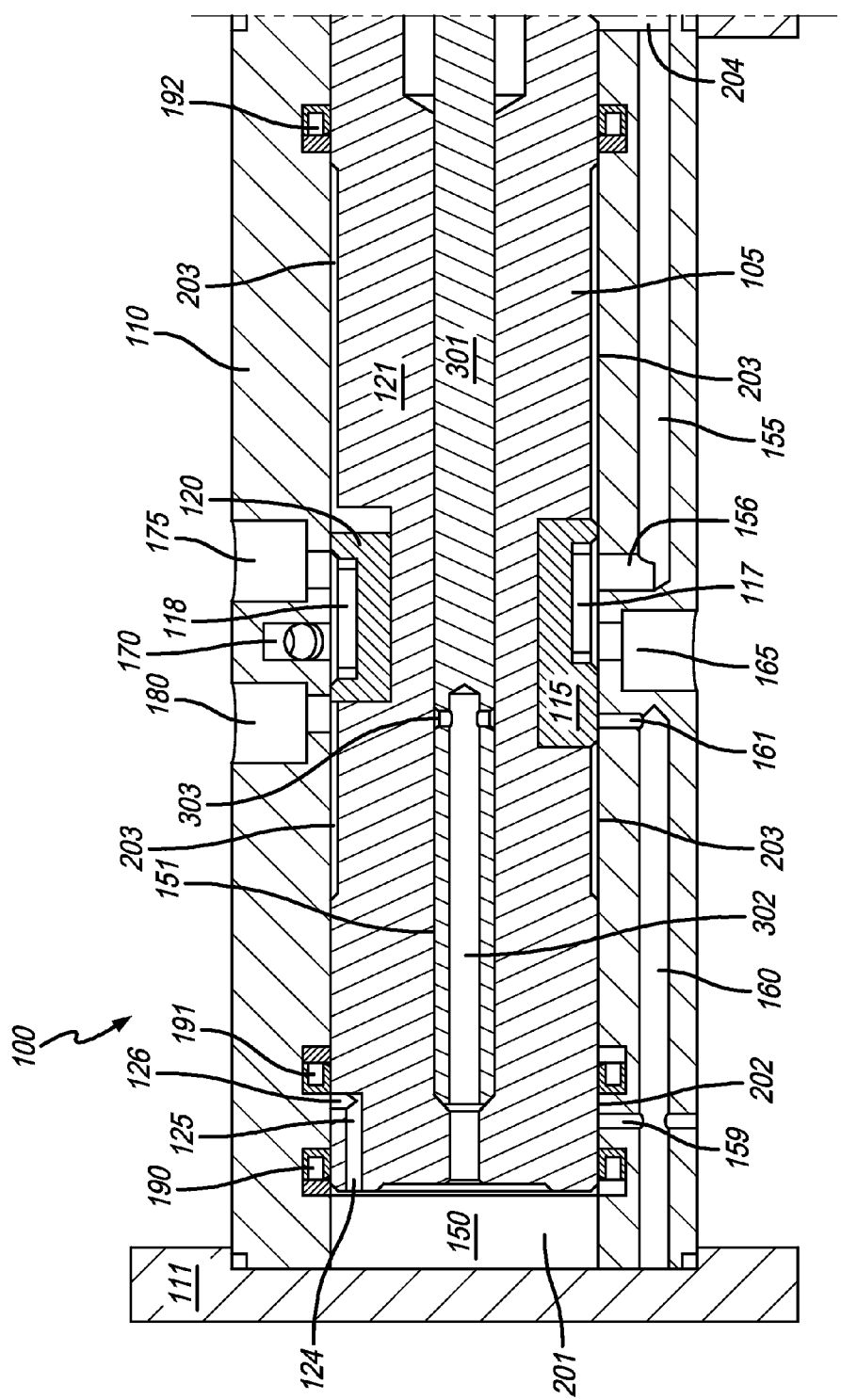
FIG. 2A is an illustration of a cross-section view of one embodiment of the spool valve during the downstroke of the spool assembly.

FIG. 2A is an illustration of a cross-section view of one embodiment of the spool valve during the downstroke of the spool assembly. As shown in FIG. 2A, one embodiment of the spool valve 100 may comprise: a spool assembly 105, spool housing 110, and cover 111. The spool assembly 105 may comprise a spool body 121, a first slide valve 115, a second slide valve 120, and a spool vent 125. The first slide valve 115 may comprise a first internal valve space 117, and the second slide valve 120 may comprise a second internal valve space 118. The spool housing 110 may comprise a first housing vent 160, a second housing vent 155, a first exhaust port 165, a second exhaust port 170, a first fluid port 180, a second fluid port 175, first seal 190, a second seal 191, and a third seal 192. FIG. 2A also show that spool housing 110 may also comprise a substantially hollow spool chamber 150, which may run essentially the entire length of the spool housing 110. FIG. 2A also shows that the spool assembly 105 may comprise a center bore 151 that may extend essentially the entire length of the spool assembly 105, and that a valve stem 301 or rod may be slidably engaged with the center bore 151. In one embodiment, valve stem 301 is provided with a valve stem bore 302 and a passage 303. Valve stem bore 302 may extend inward from upper end valve stem 301 and generally has a suitable depth such that the end of bore 302 may engage with the shoulder of center bore 151 of spool assembly 105.

In one embodiment, the width of the spool chamber 150 is the same or almost the same as the width of the spool assembly 105. In the embodiment shown in FIG. 2A, the length of the spool chamber 150 is preferably longer than the length of the spool assembly 105. Additionally, the spool assembly 105 is almost always preferably longer than the spool housing 110 in overall length, but the spool chamber 150 formed by the spool housing 110 and the top flange 602 (shown in FIGS. 3A to 3G) may create a chamber that is longer than the spool assembly 105. This may allow the spool assembly 105 to traverse up and down (or back and forth, depending upon the orientation of the reciprocating drive mechanism 1000) the length of the spool chamber 150 within the spool housing 110. Thus, the spool assembly 105 may move towards a distal end of the spool housing 110 near the cover 111 and reciprocate back to its original position at a proximate end of the spool housing 110. Thus, in its original position, the spool assembly 105 may contract the distal chamber 201 when moving towards the distal end of the spool housing 110, and may expand the distal chamber 201 when reciprocating back to its original position (at the proximate end of the spool housing 110). This may occur when the spool assembly 105 moves between the two positions repeatedly and reciprocatingly via a piston 320 (shown in FIGS. 3A to 3G). This action may cause fluid or air buildup within an end distal chamber 201 of fluid pumps (especially fluid pumps that perform longer strokes), thereby causing these pumps to stall or freeze during operation.

In addition, FIG. 2A shows that the outer distal portion of the spool assembly 105 and rear interior portion of the spool housing 110, in combination, may form a distal chamber 201. In some embodiments, the distal chamber 201 may also be formed based on the location of the the first seal 190. In a preferred embodiment, the distal chamber 201 may be located near or at the distal end of the spool housing 110 and preferably just interior to the cover 111. In one embodiment, the inlet 124 of the spool vent 125 is in communication with the distal chamber 201, such that fluid or gas within the distal chamber 201 may flow through inlet 124 and through the spool vent 125. Additionally, the center bore 151 of the spool housing is preferably in communication with the distal chamber 201.

Similarly, FIG. 2A shows that the outer perimeter of the spool assembly 105 and an interior portion of the spool housing 110, in combination, may form an intermediate chamber 202. This intermediate chamber 202 may be formed based on the location of the first seal 190, second seal 191, and the spool assembly 105. In a preferred embodiment, the intermediate chamber 202 may be located near or adjacent to the distal chamber 201 of the spool housing 110 and may be proximate to the distal chamber 201. In one embodiment, the inlet 159 of the housing vent 160 may be in communication with the intermediate chamber 202, such that fluid or gas within the intermediate chamber 202 may flow through inlet 159 of the housing vent 160 and through the housing vent 160.

Moreover, FIG. 2A shows that the outer perimeter of the spool assembly 105 and an interior portion of the spool housing 110, in combination, also may form a supply chamber 203. Specifically, the supply chamber 203 may be formed based on the location of the second seal 191 and third seal 192 and may be located near or adjacent to the intermediate chamber 202 of the spool housing 110. In one embodiment, depending upon the position of the spool assembly 105 within the spool chamber 150, the second housing vent 155, second fluid port 175, and third fluid port 180 may either be in communication with the supply chamber 203 or may be in communication with the internal valve spaces 117, 118 of slide valves 115, 120. This may allow fluid or gas in the supply chamber 203 to selectively travel through second housing vent 155 and fluid ports 175, 180 in order to enter and exit the supply chamber 203 within the spool valve 100. In a preferred embodiment, first housing vent 160 is preferably in fluid communication with the first internal valve space 117 of the first slide valve 115 at the upstroke of spool valve 100 while the first slide valve 115 is at its first position (i.e., during the upstroke of the spool valve 100, shown in FIG. 2B) and is preferably blocked by the first slide valve 115 or a portion thereof at the downstroke when the first slide valve 115 is at its second position (i.e., during the downstroke of the spool valve 100 shown in FIG. 2A).

Furthermore, an outer perimeter of the spool assembly 105 and an interior portion of the spool housing 110, in combination, also may form a proximal chamber 204 (shown in FIGS. 3A-3G). Specifically, the proximal chamber 204 may be formed based on the location of the third seal 192 and may be located near or adjacent to the supply chamber 203 of the spool housing 110. In a preferred embodiment, inlet 154 of housing vent 155 is in fluid communication with the proximal chamber 204, such that fluid or gas in the proximal chamber 204 may flow through the second housing vent 155. Additionally, the proximal chamber 204 is preferably in communication with the second cylindrical space 359 (shown in FIGS. 3A-3G) of the piston housing 601.

FIG. 2A also shows that, in a preferred embodiment, the exhaust ports 165, 170 are generally in communication with internal valve spaces 117, 118 of slide valves 115, 120. Specifically, first exhaust port 165 may be in fluid communication with the first internal valve space 117 of the first slide valve 115 when the first slide valve 115 is at its first position (i.e., during the upstroke of the spool valve 100, shown in FIG. 2B), and the second exhaust port 170 may be in fluid communication with the second internal valve space 118 of the second slide valve 120 when the second slide valve 120 is at its second position (i.e., during the downstroke of the spool valve 100, shown in FIG. 2A). Thus, depending upon whether the spool assembly 105 is in the upstroke or downstroke position, second fluid port 175 or first fluid port 180 (but not both simultaneously) may be in fluid communication with the second internal valve space 118. Similarly, depending upon whether the spool assembly 105 is in the upstroke or downstroke position, outlet 156 of the second housing vent 155 or outlet 161 of housing vent 160 may be in fluid communication with the first internal valve space 117.

FIG. 2A also shows that, during the downstroke of the spool valve 100, second fluid port 175 may be in fluid communication with the second exhaust port 170. At this moment, first fluid port 180 is preferably in fluid communication with the supply chamber 203, thereby allowing any fluid or gas within the supply chamber 203 to travel through the first fluid port 180. Additionally, in this embodiment, during the downstroke, outlet 156 of the second housing vent 155 is preferably in fluid communication with the first internal valve space 117 (and thus also in fluid communication with the first exhaust port 165). At this moment, the outlet 161 of the first housing vent 160 is preferably straddled or blocked by the first slide valve 115 or a portion thereof when the first slide valve 115 is at its second position to prevent any fluid or gas from traveling through the outlet 161 of the first housing vent 160.

Importantly, regarding the spool vent 125, FIG. 2A shows that when the spool assembly 105 moves within the spool chamber 150, the outlet 126 of the spool vent 125 may align within the intermediate chamber 202. This may allow any fluid or gas located within the distal chamber 201 to travel or communicate with the intermediate chamber 202 via spool vent 125 and thus the first housing vent 160 through its inlet 159. Thus, once the first internal valve space 117 of the first slide valve 115 aligns with the outlet 161 of the first housing vent 160 and first exhaust port 165 (i.e., when the first slide valve 115 is at its first position), fluid or gas in the first housing vent 160 may also communicate through the first exhaust port 165.

Finally, FIG. 2A shows that a valve stem 301 may be slideably engaged with the center bore 151 of the spool assembly 105. FIG. 2A also shows that the valve stem bore 302 and passage 303 of the valve stem 301 is generally in fluid communication with the center bore 151 of the spool assembly 105 and thus distal chamber 201. This preferably allows any fluid or gas located in the valve stem bore 302 and passage 303 of the valve stem 301 (and perhaps the center bore 151) to travel or communicate towards and within the distal chamber 201, which may expand the distal chamber 201 and push or act against spool assembly 105 to perform a downstroke. Although FIG. 2A shows a specific number of vents and slide valves, any number of vents and valves may be used to allow fluid/gas to exit the reciprocating drive pump.

Figure 2B:
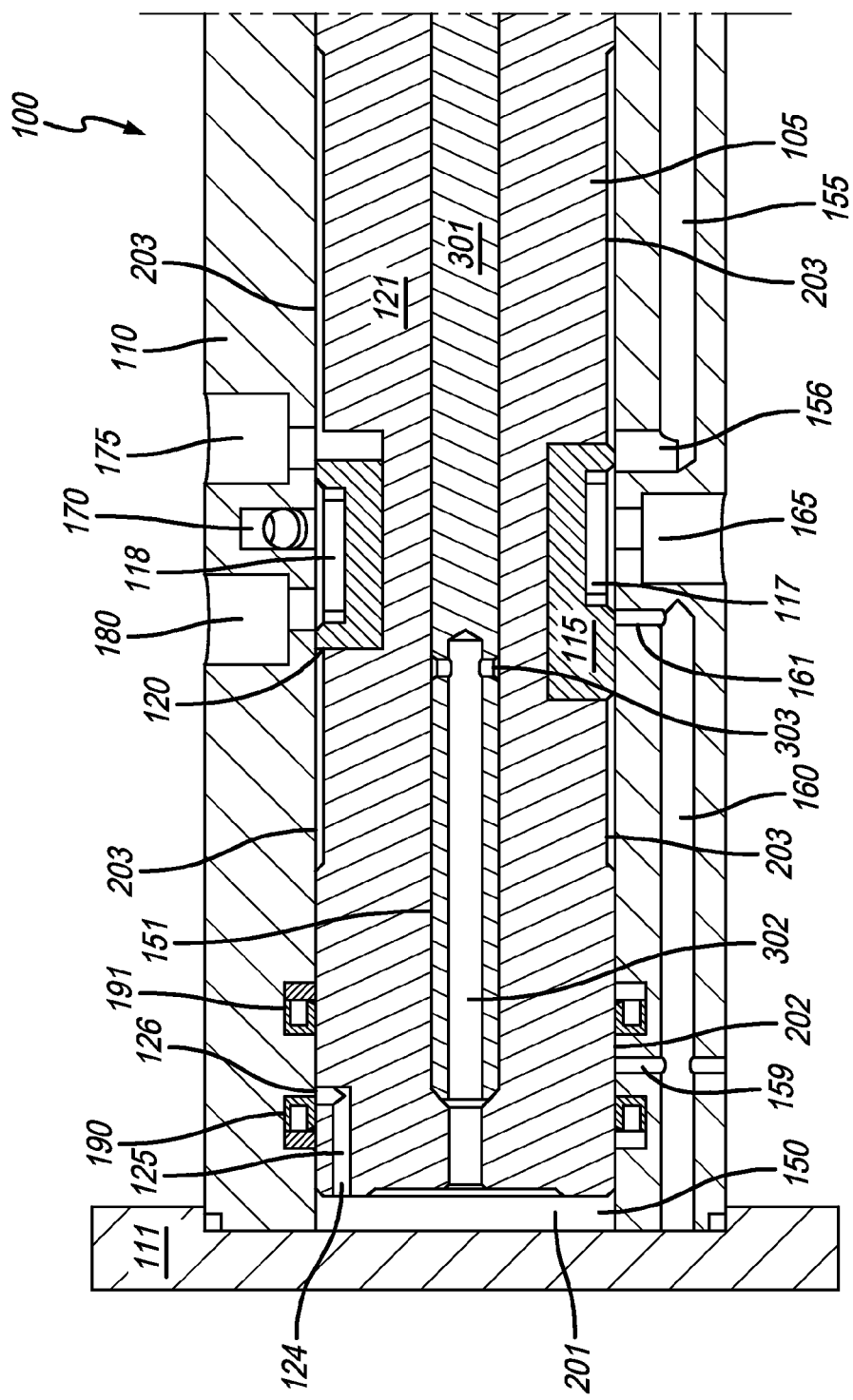
FIG. 2B is an illustration of a cross-section view of one embodiment of the spool valve during the upstroke of the spool assembly.

FIG. 2B is an illustration of a cross-section view of one embodiment of the spool valve during the upstroke of the spool assembly. FIG. 2B shows that, during the upstroke of the spool valve 100, first fluid port 180 may be in communication with the second internal valve space 118 of the second slide valve 120. This may allow any fluid or gas in the first fluid port 180 to communicate through the second exhaust port 170. At this moment, the second fluid port 175 is preferably in fluid communication with the supply chamber 203, thereby allowing any fluid or gas within the supply chamber 203 to travel through the second fluid port 175. Additionally, in this embodiment, during the upstroke of the spool valve 100, outlet 161 of the first housing vent 160 preferably communicates with the first internal valve space 117 (and hence the first exhaust port 165). At this moment, the second housing vent 155 is preferably in fluid communication with the supply chamber 203, thereby allowing any fluid or gas within the supply chamber 203 to also travel through the second housing port 155. Because proximal chamber 204 is preferably in communication with the second cylindrical space 359 of the piston housing 601, control fluid in supply chamber 203 may communicate with second cylindrical space 359 depending upon whether spool assembly 105 is performing the upstroke or downstroke.

Importantly, FIG. 2B shows that, when the spool assembly 105 is positioned approximately near the distal end of the spool housing 110 or cover 111, the spool vent 125, first housing vent 160, first exhaust port 165, and first internal valve space 117 of slide valve 115 may align with one another at certain time periods so that air within the distal chamber 201 may escape. For example, in one embodiment, the outlet 126 of spool vent 125 may align within the intermediate chamber 202 at the same time while the first internal valve space 117 of the first slide valve 115 aligns with both the exhaust port 165 and the outlet 161 of the first housing vent 160. Preferably, this alignment happens when the distance between the distal end of the spool assembly 105 and the cover 111 is very small. This will preferably allow the trapped air of within the distal chamber 201 to be released, especially when the distal chamber expands or decrease to a certain length. This will preferably allow the spool vent 125, outlet 161 of the first housing vent 160, first exhaust port 165, and first internal valve space 117 of the first slide valve 115 to be in fluid communication, thereby allowing the air trapped in the distal chamber 201 to vent or escape out from the reciprocating drive mechanism 1000. In other embodiments, the outlet 126 of spool vent 125, first housing vent 160, first exhaust port 165, and first internal valve space 117 of the slide valve 115 may align with one another at other various distances between the spool assembly 105 and cover 111, such as approximately between 0.5 inches or 0.75 inches.

Conversely, when spool assembly 105 moves within the spool chamber 150, the outlet 126 of the spool vent 125 may not align with the intermediate chamber 202 (e.g., the outlet 126 of the spool vent 125 may be straddled or blocked by seals 190, 191). This may prevent any fluid or gas located within the distal chamber 201 and the spool vent 125 to travel or communicate within the intermediate chamber 202 and thus first housing vent 160. However, once the outlet 126 of the spool vent 125 aligns within the intermediate chamber 202, fluid or gas within the distal chamber 201 and spool vent 125 may also communicate through the first housing vent 160.

In another embodiment of the reciprocating drive mechanism 1000, fluid or air located inside the distal chamber 201 may exit the spool housing 110 at various time intervals. This may occur when the outlet 126 of the spool vent 125 first aligns within the intermediate chamber 202, such that air moves from distal chamber 201, into the intermediate chamber 202. However, during this time, the outlet 161 of first housing vent may be blocked or straddled by the first slide valve 115 (when the first slide valve 115 is at its second position), thus preventing fluid or air from communicating through the first internal valve space 117 and thus first exhaust port 165. However, once spool assembly 105 reaches the distal end of the spool chamber 150 possibly due to the upward longitudinal movement of valve stem 301, outlet 161 of first housing vent 160 may be in communication with the first internal valve space 117, thereby allowing the fluid or air in the first housing vent 160 to communicate through the first exhaust port 165. Thus, the fluid or air that has first moved into the first housing vent 160 may then pass through the outlet 161 of the first housing vent 160 to the first internal valve space 117 of the first slide valve 115 and out through the first exhaust port 165 when the first internal valve space 117 of the first slide valve 115 aligns with the outlet 161 of the first housing vent 160 and first exhaust port 165 (when the first slide valve 115 is at its first position). Accordingly, when the spool assembly 105 moves to one or more specific position(s) within the spool housing 110, the outlet 126 of the spool vent 125 may first align within the intermediate chamber 202, which will allow fluid or air within the distal chamber 201 to flow through the spool assembly 105, through the intermediate chamber 202 and through the inlet 159 of the first housing vent 160. The fluid or gas in the housing vent 160 may then travel through the outlet 161 of the first housing vent 160 and through the first slide valve 115 and first exhaust port 165 once the first internal valve space 117 of the first slide valve 115 aligns with the outlet 161 of the first housing vent 160 and first exhaust port 165, such that any air trapped in distal chamber 201 may exit the spool valve 100. Because the air trapped in distal chamber 201 is released, it preferably does not interfere with the movement of the spool assembly 105, thereby allowing the spool assembly 105 to continue traveling towards the cover 111.

FIGS. 3A to 3G are illustrations of a cross-section view of one embodiment of the reciprocating drive mechanism and shows the reciprocating drive mechanism in operation. As discussed above, the reciprocating drive mechanism 1000 generally refers to any mechanical device that raises, transfers, delivers, or compresses fluids or that attenuates gases especially by suction or pressure or both. First, FIGS. 3A to 3G show that the spool valve 100 may be coupled to a piston assembly 600 for driving a pump. The piston assembly 600 may be formed by a piston housing 601, piston 320, and valve stem 301. Specifically, the piston housing 601 may comprise a top flange 602, bottom flange 603, and a cylindrical side wall 604. FIGS. 3A to 3G also show that the top flange 602, bottom flange 603, and the cylindrical side wall 604 may form a piston chamber where the piston 320 is reciprocally movable within the piston chamber and divides the piston chamber into cylindrical spaces 359, 360. Specifically, piston 320 may divide the piston chamber to a first cylindrical space 360 and a second cylindrical space 359. In this manner, when piston 320 moves downwards towards the bottom flange 603 or performs a downstroke, first cylindrical space 360 preferably narrows while second cylindrical space 359 expands. Conversely, when piston 320 moves upwards towards the top flange 602 or performs an upstroke, first cylindrical space 360 preferably expands while second cylindrical space 359 narrows.

FIGS. 3A to 3G also show that the proximal portion of the valve stem 301 is preferably connected or attached to the piston 320, while the distal portion of the valve stem 301 is preferably slideably and reciprocally engaged within the center bore 151 of the spool assembly 105. Because top flange 602 preferably comprises a valve stem opening 605 and a fourth seal 610 disposed within the valve stem opening 605, the fourth seal 610 is preferably slideably engaged with said valve stem 301.

Importantly, FIGS. 3A to 3G show that valve stem 301 preferably comprises a valve stem bore 302 and a passage 303, wherein the valve stem bore 302 and the passage 303 are preferably in communication with the center bore 151 of the spool assembly 105. This allows fluid or gas to communicate from the valve stem bore 302 and passage 303 to the distal chamber 201 of the spool valve 100. Thus, when passage 303 is exposed within second cylindrical space 359 after the piston 320 moves towards the bottom flange 603 and shifts and exposes passage 303 of the valve stem 301 within the second cylindrical space 359, valve stem bore 302 of valve stem 301 communicates with the second cylindrical space 359.

FIGS. 3A to 3G also shows that the reciprocating drive mechanism 1000 may comprise a first fluid conduit 401 and a second fluid conduit 402. Specifically, FIGS. 3A to 3G shows that fluid conduit 401 is preferably coupled between first fluid port 180 and first port 503 of the bottom flange 603 of the piston housing 601, such that first fluid conduit 401 allows fluid or gas in the first fluid port 180 to communicate with the first cylindrical space 360. FIGS. 3A to 3G also shows that the second fluid conduit 402 is preferably coupled between the second fluid port 175 and second port 502 of the top flange 602 of the piston housing 601, such that the second fluid conduit 402 allows fluid or gas in second fluid port 175 to communicate with the second cylindrical space 359.

Figure 3A:
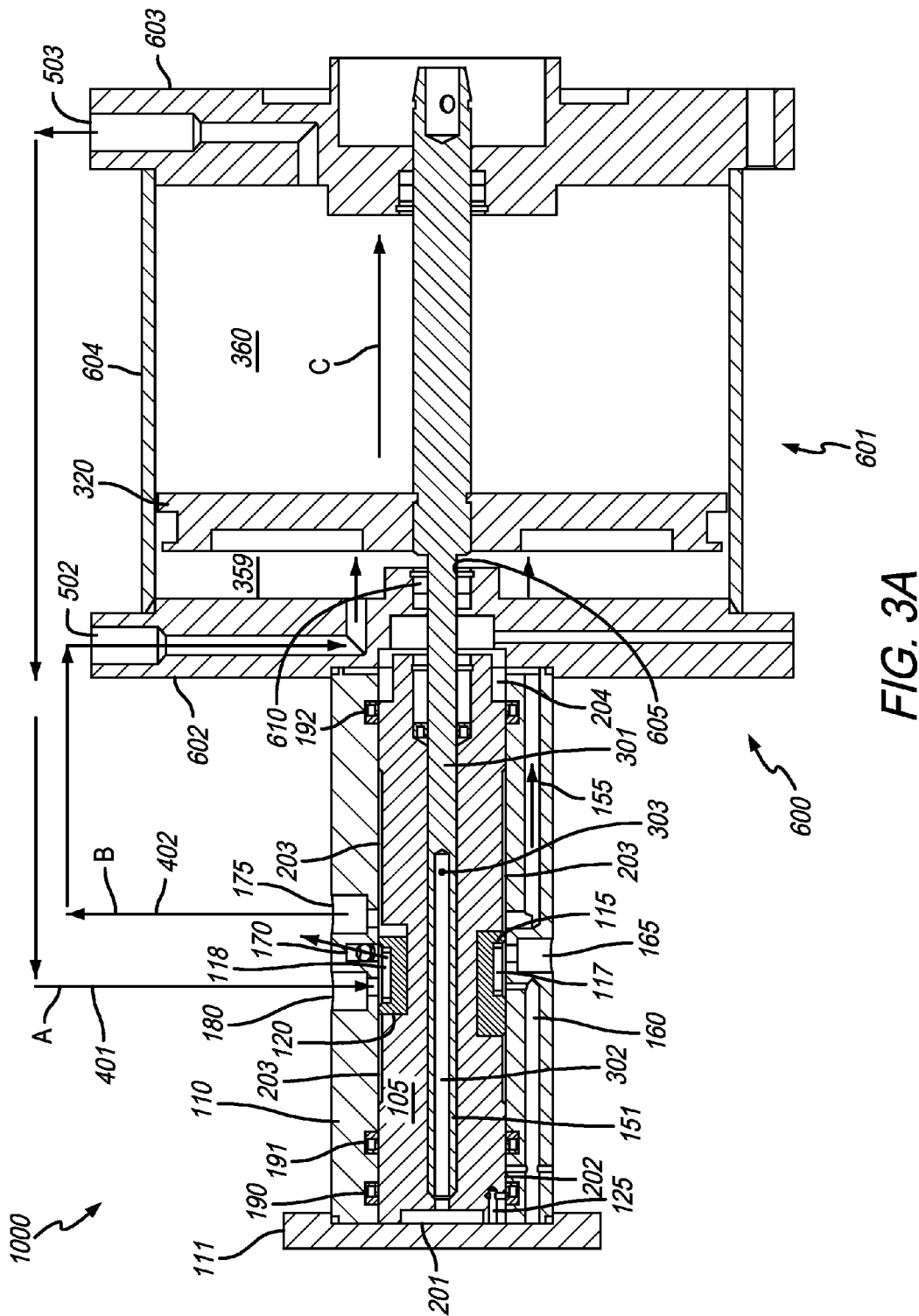
FIGS. 3A to 3G are illustrations of a cross-section view of one embodiment of the reciprocating drive mechanism and shows the reciprocating drive mechanism in operation.

FIGS. 3A to 3G also shows the reciprocating drive mechanism 1000 in operation. Specifically, FIG. 3A shows the reciprocating drive mechanism 1000 at the beginning of its downstroke. As spool valve 100 is in the position of FIG. 3A at the end of its upstroke (i.e., while the distal ends of the spool valve 100 and valve stem 301 are near or adjacent to the cover 111) and the slide valves 115, 120 are in their first position, pressurized control fluid communicates or travels in the direction of ARROW B from the supply chamber 203 to the second cylindrical space 359 via the second fluid port 175, second fluid conduit 402, and second port 502 to apply pressure against the top surface of piston 320 in order to move piston 320 and valve stem 301 downwards in the direction of ARROW C. Pressurized control fluid is also preferably communicated from supply chamber 203 through the second housing vent 155 and into proximal chamber 204, which is preferably in communication with the second cylindrical space 359. This also preferably provides longitudinal downstroke movement in the direction of ARROW C. During this time, the first cylindrical space 360 is preferably vented to ambient pressure as the first cylindrical space 360 is in communication with the second exhaust port 170 via first fluid port 180, first fluid conduit 401, first port 503 and second internal valve space 118 of second slide valve 120 in its first position.

Figure 3B:
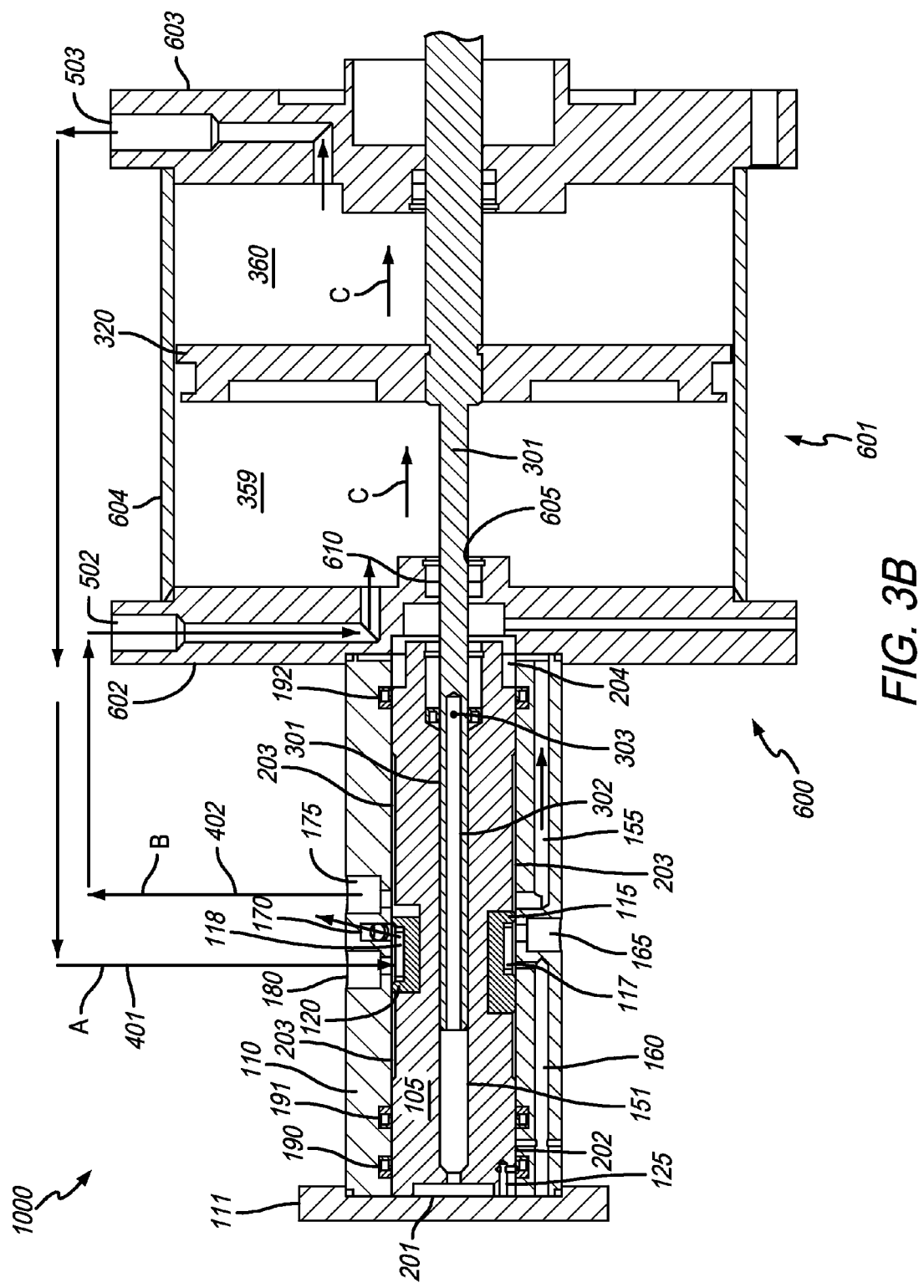
Figure 3C:
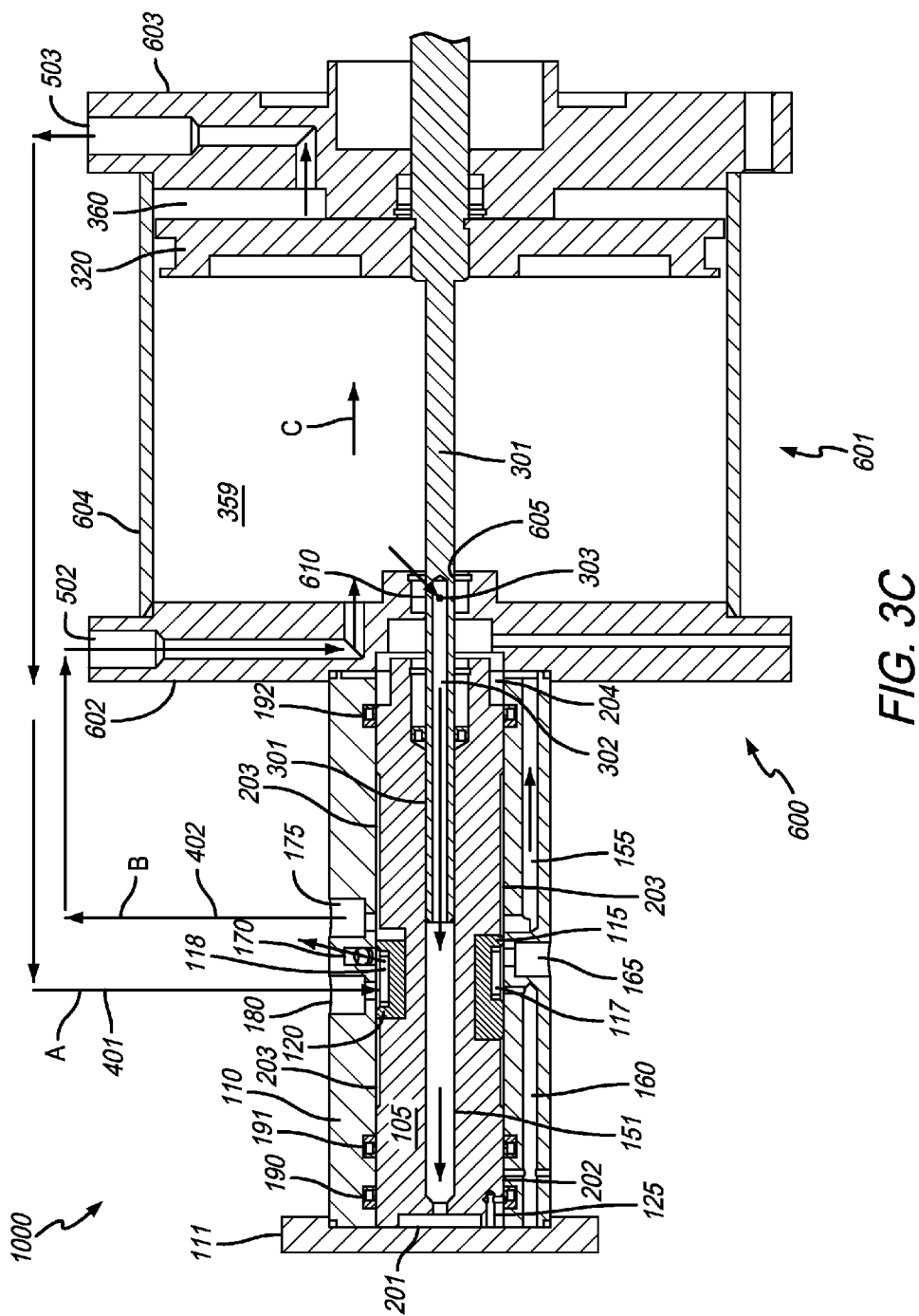

FIG. 3B shows the piston 320 and valve stem 301 during their downwards longitudinal movement. As discussed above, first cylindrical space 360 is preferably in communication with second exhaust port 170 via first fluid port 180, first fluid conduit 401, first port 503, and second internal valve space 118 of the second slide valve 120 in its first position. As piston 320 continues to move downwards in the direction of the ARROW C, fluid in second cylindrical space 360 continues to vent through the second exhaust port 170 towards ambient pressure in the direction of ARROW A. Pressurized control fluid, on the other hand, continues to communicate in the direction of ARROW B from supply chamber 203 through second fluid port 175, second fluid conduit 402, and second port 502, to apply pressure and act against the top surface of piston 320. Pressurized control fluid is also communicated from supply chamber 203 through housing vent 155 and proximal chamber 204, both of which are also preferably in fluid communication with the first cylindrical space 359. Preferably, spool assembly 105 is still positioned near or adjacent to cover 111. However, the continued downward motion of piston 320 will also move valve stem 301 towards first cylindrical space 359 until the upper end portion of the valve stem exposes passage 303 into the first cylindrical space 359, as shown in FIG. 3C. Additionally exposing passage 303 of valve stem 301 preferably allows pressurized fluid to communicate through valve stem bore 302, center bore 151 of spool assembly 105, and eventually the distal chamber 201 of the spool valve 100. Once valve stem bore 302 and passage 303 provides communication between second cylindrical space 359 and the distal chamber 201, spool assembly 105 also performs its downward movement due to pressurized fluid acting against the distal end of the spool assembly 105 in distal chamber 201.

FIG. 3C shows valve stem bore 302 and passage 303 in communication with the second cylindrical space 359. At this time, piston 320 and valve stem 301 may be near the end of their downwards longitudinal movement. Control fluid provided by the supply chamber 203 of spool valve 100 preferably still communicates through the second fluid port 175, second fluid conduit 402, second port 502, in the direction of ARROW B to second cylindrical space 359 to provide control or supply fluid acting on the top surface of piston 320. Pressurized control fluid is also communicated from supply chamber 203 and proximal chamber 204 through the second housing vent 155, which is also preferably in communication with the second cylindrical space 359. This preferably continues to drive piston 320 and its valve stem 301 in the direction of ARROW C. During this time, the first cylindrical space 360 continues to vent fluid through the second exhaust port 170 towards ambient pressure via the first fluid port 180, first fluid conduit 401, first port 503, and second internal valve space 118 of the second slide valve 120 in direction ARROW A. Importantly, control fluid supplied into the second cylindrical space 359, however, communicates through valve stem bore 302 and passage 303 and travels through center bore 151. This may cause pressurized fluid to build in distal chamber 201 of the spool housing 110, thereby acting against spool assembly 105. As a result, spool assembly 105 may begin to perform a downstroke towards the piston assembly 600, which preferably causes slide valve members 115, 120 to shift from their first position and towards their second position. The shifting of slide valve members 115, 120 from their first position towards their second position preferably causes (1) the second exhaust port 170 to be in communication with the second fluid port 175 and (2) the first exhaust port 165 to be in communication with the second housing vent 155, as shown in FIG. 3D.

Figure 3D:
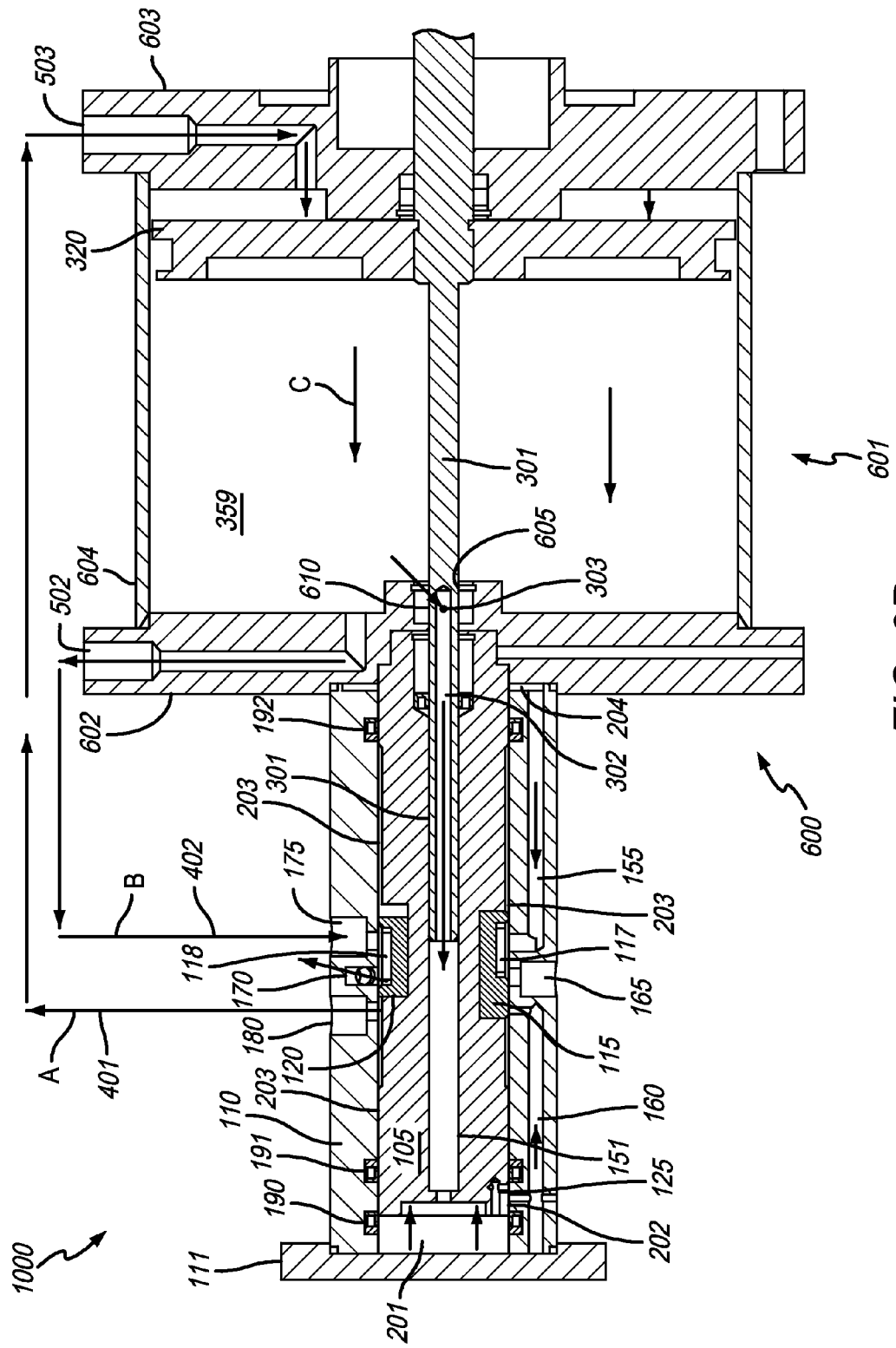

FIG. 3D shows the spool assembly 105 performing a downstroke due to the pressurized control fluid buildup in the distal chamber 201. During this time, passage 303 has been exposed within the second cylindrical space 359, thereby causing pressurized control fluid within the second cylindrical space 359 to travel into distal chamber 201 via center bore 151 of spool assembly 105 and valve stem bore 302. Movement of spool assembly 105 causes slide valves 115, 120 to shift from their first position to the second position. As a result, second exhaust port 170 is in communication with the second fluid port 175, and the first exhaust port 165 is in communication with the second housing vent 155. This preferably causes pressurized control fluid to travel into the first cylindrical space 360 in the direction of ARROW A. Fluid in the second cylindrical space 359, on the other hand, begins to vent to ambient pressure through exhaust ports 170, 165. Specifically, the second cylindrical space 360 is preferably in communication with the first fluid port 180, first fluid conduit 401, and first port 503, which causes control fluid to travel from the supply chamber 203 and into the first cylindrical space 360. This preferably creates pressure against the bottom surface of piston 320, thereby moving the piston 320 and valve stem 301 upwards in the direction of ARROW C. During this time, the second cylindrical space 359 is preferably in communication with exhaust port 170 via second fluid port 175, second fluid conduit 402, second port 502, and second internal valve space 118 of the second slide valve 120 in its first position. This causes control fluid to travel from supply chamber 203 and into the first cylindrical space 360, thereby creating pressure against the bottom surface of piston 320 and thus moving piston 320 and valve stem 301 upwards in the direction of ARROW C.

During this time, outlet 126 of spool vent 125 may be in communication with intermediate chamber 202 of spool valve 100. This allows fluid in the distal chamber 201 to travel through spool vent 125, intermediate chamber 202, and into the first housing vent 160. Because spool valve 105 is in the downstroke position, a portion of the first slide valve 115 may straddle or block the outlet 161 of the first housing vent 160, thereby preventing fluid in the first housing vent 160 from communicating through the first exhaust port 165.

Figure 3E:
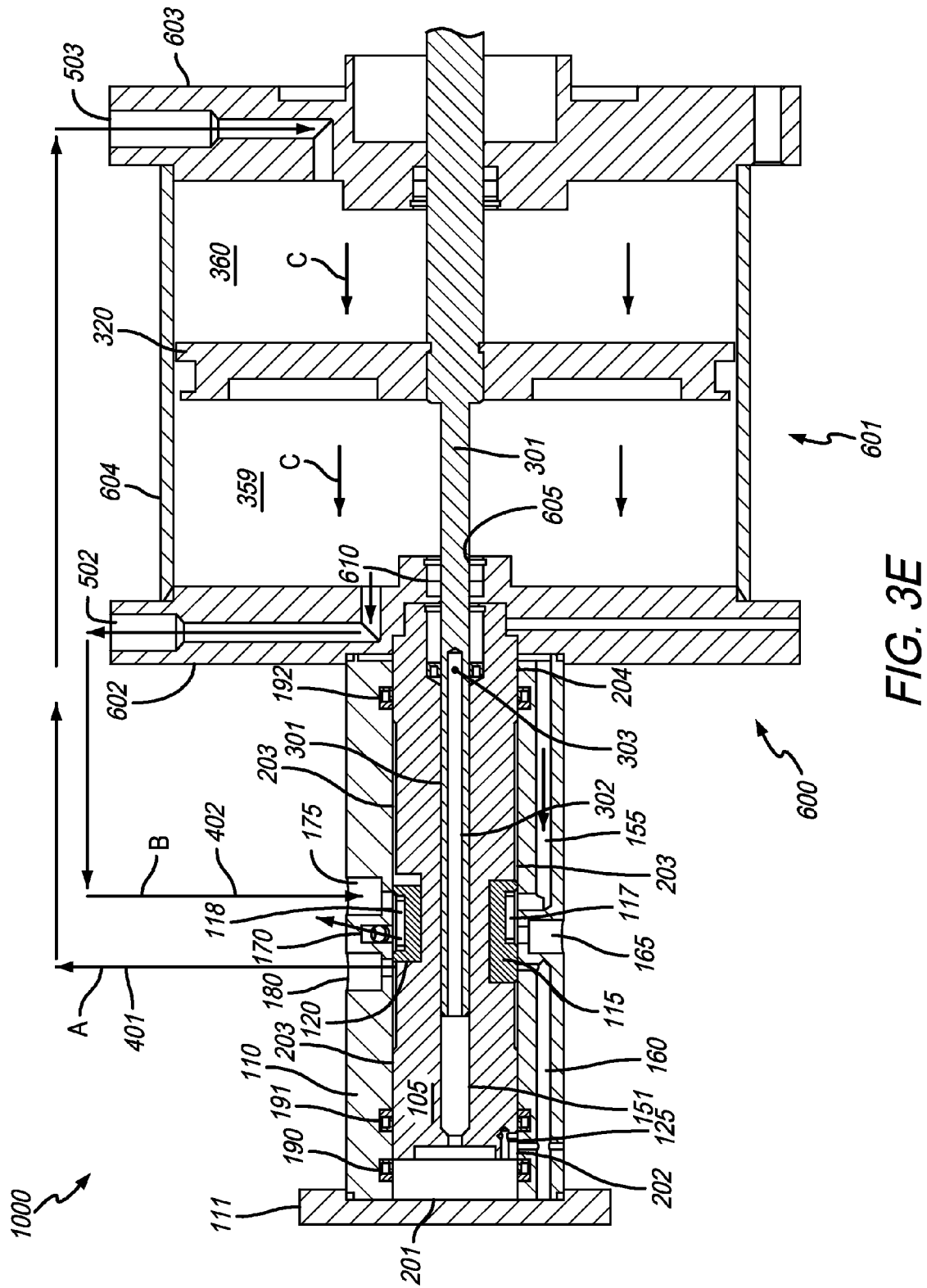
Figure 3F:
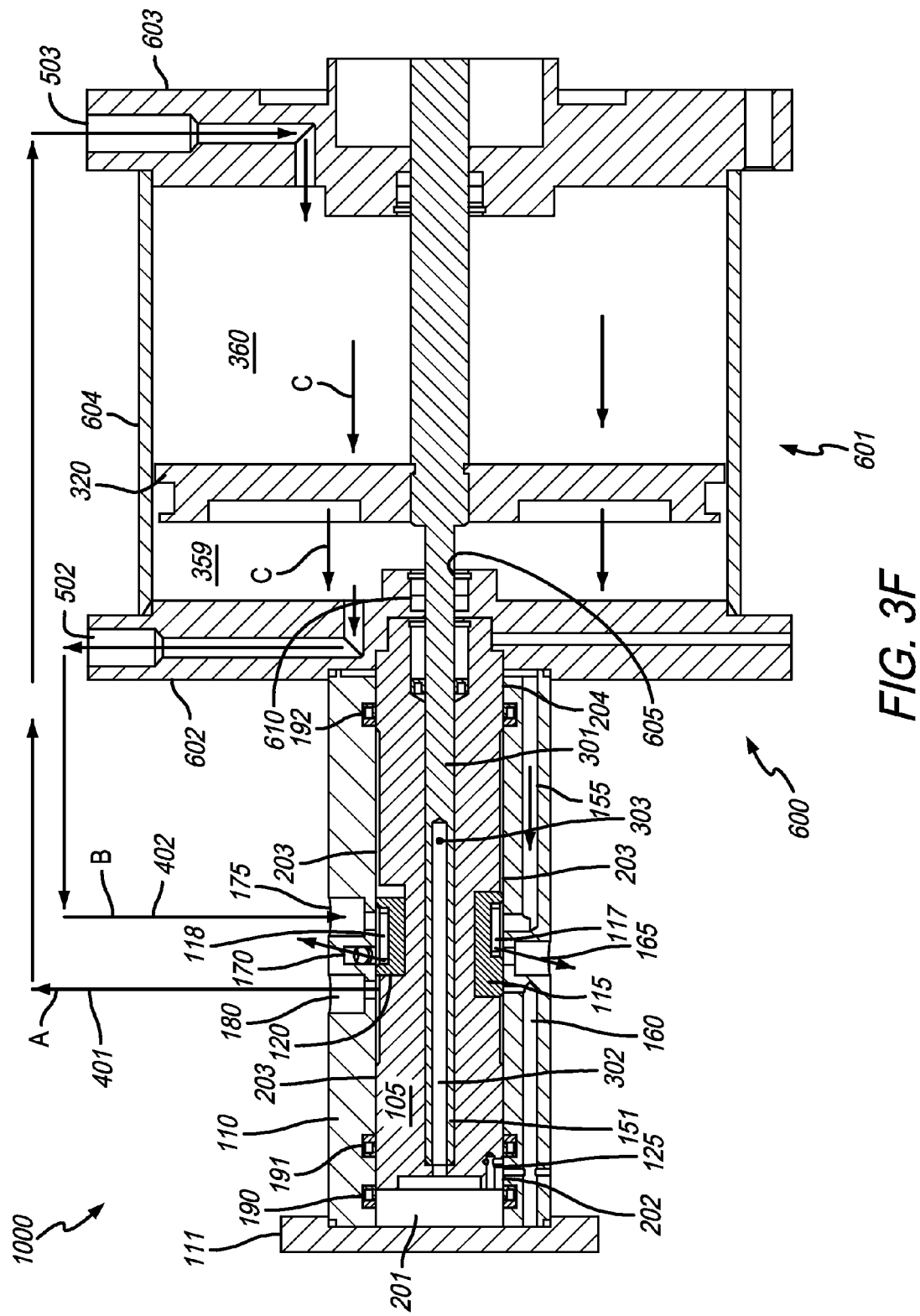

FIG. 3E shows the piston 320 and valve stem 301 during their upwards longitudinal movement. As piston 320 continues to move upwards in the direction of the ARROW C, fluid in the second cylindrical space 359 continues to vent through the first exhaust port 170 towards ambient pressure via the second fluid port 175, second fluid conduit 402, second port 502, and second internal valve space 118 of the second slide valve 120 in its second position. Additionally, fluid in the second cylindrical space 359 continues to vent through the first exhaust port 165 via the second housing vent 155, first internal valve space 117 of the first slide valve 115, and the proximal chamber 204. Pressurized control fluid, on the other hand, continues to communicate in the direction of the ARROW A from supply chamber 203 through fluid port 180, fluid conduit 401, and first port 503, in order to apply pressure against the bottom surface of piston 320. Spool assembly 105 is generally still positioned near or adjacent to the top flange 602 but the continued upward motion of piston 320 will also preferably move the upper end of the valve stem 301 towards the distal end of the center bore 151 until the upper end portion of the valve stem engages against the shoulder of center bore 151, as shown in FIG. 3F. This upward movement preferably shifts the valve stem bore 302 and passage 303 within the spool assembly 105, thereby preventing fluid in the second cylindrical space 359 from traveling through passage 303, valve stem bore 302, center bore 151, and distal chamber 201. As a result, pressurized control fluid no longer communicates into the distal chamber 201. Fluid within the distal chamber 201 may still remain within the spool vent 125, intermediate chamber 202, and housing vent 160 due to the blockage of outlet 161 caused by the first slide valve 115.

FIG. 3F shows the upper end of valve stem 301 engaged against the shoulder of center bore 151. At this time, fluid in the second cylindrical space 359 generally continues to vent through the second exhaust port 170 towards ambient pressure in the direction of ARROW B via second fluid port 175, second fluid conduit 402, second port 502, and the second internal valve space 117 of the second slide valve 120 in its second position. Fluid in the second cylindrical space 359 also preferably continues to vent through the first exhaust port 165 via the second housing vent 155, proximal chamber 204, and first internal valve space 118 of the first slide valve 120 in the second position. Pressurized control fluid, on the other hand, continues to communicate in the direction of the ARROW A from supply chamber 203 through the first fluid port 180, first fluid conduit 401, and first port 503. This continues to create pressure against the bottom surface of piston 320, causing piston 320 to continue moving upwards in the direction of the ARROW C. This preferably causes spool assembly 105 to begin its upstroke due to the longitudinal movement of valve stem 301 and piston 320. Fluid in the second cylindrical space 359 is preferably still blocked and prevented from traveling through passage 303, valve stem bore 302, center bore 151, and thus distal chamber 201. Once the spool assembly 105 moves towards the cover 111, slide valves 115, 120 begins to shift from their second position to their first position. This preferably causes (1) the second exhaust port 170 to be in communication with the first fluid port 180 and (2) the first exhaust port 165 to be in communication with outlet 161 of the first housing vent 160, as shown in FIG. 3G.

Figure 3G:
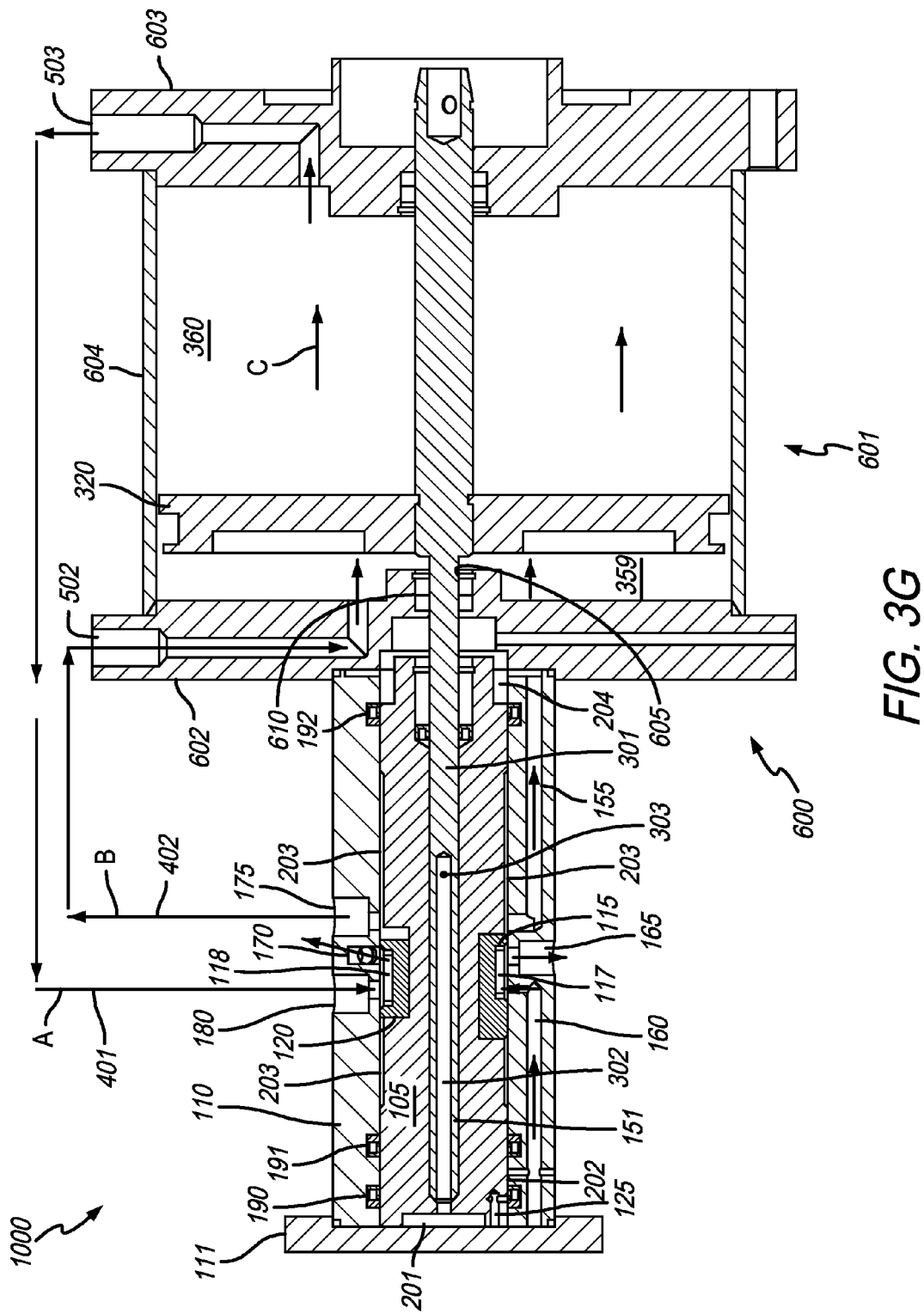

FIG. 3G shows the reciprocating drive mechanism 1000 and spool valve 100 at the end of its upstroke. As the distal ends of spool valve 100 and valve stem 301 are positioned near the cover 111, slide valves 115, 120 are preferably in their first position. This preferably allows fluid in the intermediate chamber 202, and the first housing vent 160 to travel through the first exhaust port 165 via the first internal valve space 117 of the first slide valve 115. Additionally, pressurized control fluid is communicated in the direction of the ARROW B from supply chamber 203 to the second cylindrical space 359 through the second fluid port 175, second fluid conduit 402, and second port 502, to again apply pressure against the top surface of piston 320. This preferably allows piston 320 and valve stem 301 to again move downwards in the direction of ARROW C. Pressurized control fluid is also communicated from supply chamber 203 through the second housing vent 155, which is also preferably in fluid communication with the second cylindrical space 359. This also preferably provides longitudinal downstroke movement in the direction of ARROW C. During this time, the first cylindrical space 360 is preferably vented towards ambient pressure as the first cylindrical space 360 is in communication with the second exhaust port 170 via the first fluid port 180, first fluid conduit 401, first port 503 and second internal valve space 118 of the second slide valve 120 in its first position. The reciprocating drive mechanism 1000 or pump now repeats the strokes from left to right again (i.e., FIGS. 3A-3G) following the above method over and over again repeatedly.

Figure 4:
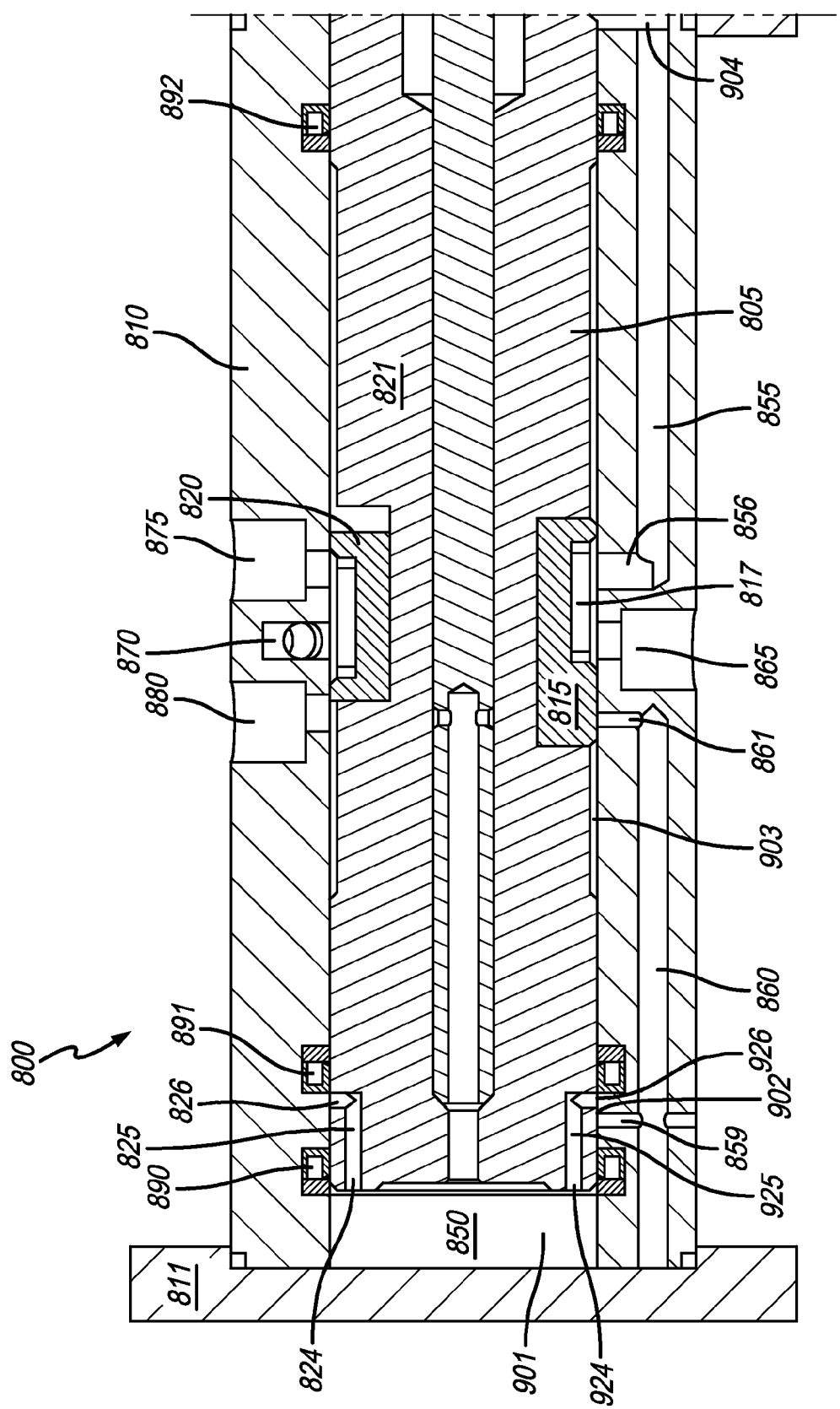
FIG. 4 is an illustration of a cross-section view of another embodiment of the spool valve and shows the spool valve with two spool vents.

FIG. 4 is an illustration of a cross-section view of another embodiment of the spool valve and shows the spool valve with two spool vents. As shown in FIG. 4, another embodiment of the spool valve 800 may comprise: a spool assembly 805, spool housing 810, and cover 811. The spool assembly 805 may comprise a spool body 821, a first slide valve 815, a second slide valve 820, and a first spool vent 825. The spool housing 810 may comprise a first housing vent 860, a second housing vent 855, a first exhaust port 865, a second exhaust port 870, a first fluid port 880, a second fluid port 875, a first seal 890, a second seal 891, and a third seal 892. FIG. 4 also show that spool housing 810 may also comprise a substantially hollow spool chamber 850, which may run essentially the entire length of the spool housing 810. The spool assembly 805 along with the first seal 890, second seal 891, and third seal 892 may also form the distal chamber 901, intermediate chamber 902, supply chamber 903, and proximal chamber 904, similar to the distal chamber 201, intermediate chamber 202, supply chamber 203, and proximal chamber 204 shown in FIGS. 2A-2B and 3A-3G.

Importantly, FIG. 4 shows that the spool assembly 805 of the spool valve 800 may also comprise a second spool vent 925. The second spool vent 925 may provide an additional passage for fluid or air buildup in the distal chamber 201 to communicate to the first housing vent 855. In this embodiment, the inlet 824 of the first spool vent 825 may be in communication with the distal chamber 901, and the outlet 826 of the first spool vent 825 may be located at an outer perimeter of the spool assembly 805. This may allow the first spool vent 825 to traverse from a distal end of the spool assembly 805 to an outer perimeter surface of the spool assembly 805. Similarly, the inlet 924 of the second spool vent 925 may be in communication with the distal chamber 901, and the outlet 926 of the second spool vent 925 may be located at another location at the outer perimeter of the spool assembly 905. This may also allow the second spool vent 925 to traverse from a distal end of the spool assembly 905 to an outer perimeter surface of the spool assembly 905. This addition of a second spool vent 925 may increase the removal or transfer of air or fluid buildup from the distal chamber 901 to the first exhaust port 865. For example, when the spool assembly 805 moves within the spool chamber 850, the outlet 826 of the first spool vent 825 may align within the intermediate chamber 902. This may allow any fluid or gas located within the distal chamber 901 to travel or communicate with the intermediate chamber 902 via the first spool vent 825. Similarly, the outlet 926 of the second spool vent 925 may also align within the intermediate chamber 902. This may also allow any fluid or gas located within the distal chamber 901 to alternately travel or communicate with the intermediate chamber 902 via the second spool vent 925. Once inside the intermediate chamber 902, the fluid or air may communicate with the first housing vent 860, through inlet 859. As the spool assembly 805 moves within the spool chamber 850, the internal valve space 817 of the slide valve 815 may align with the outlet 861 of the housing vent 860 and exhaust port 865 (i.e., when slide valve 815 is at its first position), thereby allowing fluid or gas within housing vent 860 to also communicate through the exhaust port 865. Although FIG. 4 only shows two spool vents, any number of spool vents such as three or four may be used for the reciprocating drive mechanism.

Figure 5:
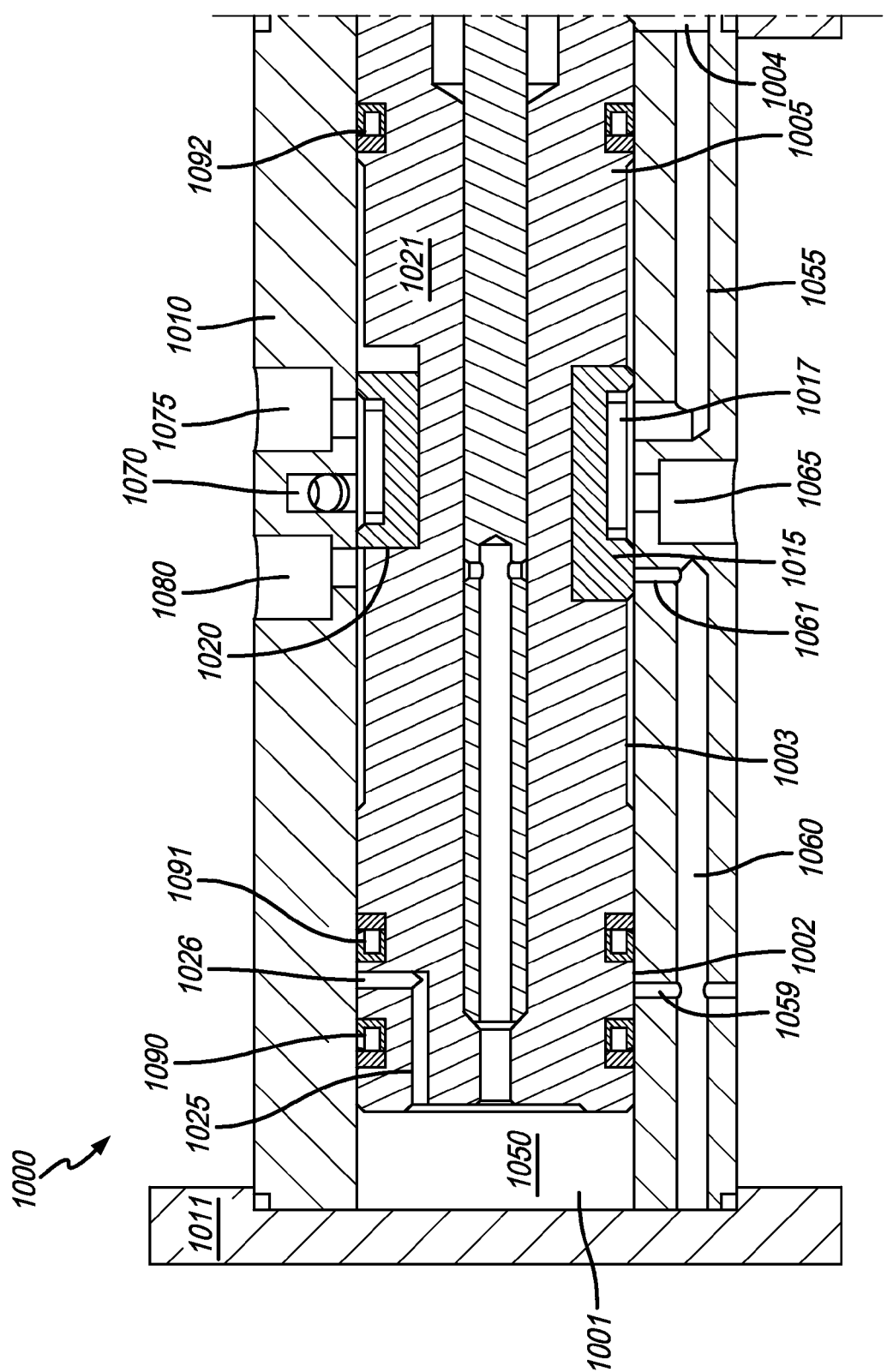
FIG. 5 is an illustration of a cross-section view of another embodiment of the spool valve and shows the seals disposed around the spool assembly and not the spool housing.

FIG. 5 is an illustration of a cross-section view of another embodiment of the spool valve and shows the seals disposed around the spool assembly and not the spool housing. As shown in FIG. 5, another embodiment of the spool valve 1000 may comprise: a spool assembly 1005, spool housing 1010, and cover 1011. The spool assembly 1005 may comprise a spool body 1021, a first slide valve 1015, a second slide valve 1020, a spool vent 1025, a first seal 1090, a second seal 1091, and a third seal 1092. The spool housing 1010 may comprise a first housing vent 1060, a second housing vent 1055, a first exhaust port 1065, a second exhaust port 1070, a first fluid port 1080, a second fluid port 1075. FIG. 5 also show that spool housing 1010 may also comprise a substantially hollow spool chamber 1050, which may run essentially the entire length of the spool housing 1010. The spool assembly 1005 along with the first seal 1090, second seal 1091, and third seal 1092 may also form the distal chamber 1001, intermediate chamber 1002, supply chamber 1003, and proximal chamber 1004, similar to the distal chamber 201, 901, intermediate chamber 202, 902, supply chamber 203, 903, and proximal chamber 204, 904 shown in FIGS. 2-4.

Importantly, unlike the spool valves 100, 800 shown in FIGS. 2-4, spool valve 1000, shown in FIG. 5, has the first seal 1090, second seal 1091, and third seal 1092 disposed and positioned around the grooves or outer perimeter of the spool assembly 1005 (rather than within the grooves of the spool housing 1010). In this manner, the outlet 1026 of the spool vent 1025 is preferably in constant communication with the intermediate chamber 1002. On the other hand, inlet 1059 may not always be in communication with the intermediate chamber 1002 because the intermediate chamber 1002 may shift along the spool chamber 1050, depending upon the position of the spool assembly 1005 within the spool chamber 1050. For example, when the spool assembly 1005 moves within the spool chamber 1050, the inlet 1059 of the first housing vent 1060 may align within the intermediate chamber 1002. This may allow any fluid or gas located within the distal chamber 1001 to travel or communicate into intermediate chamber 1002 via the first spool vent 1025 and possibly to the first housing vent 1060. Once inside first housing vent 1060, the fluid or air may communicate with the exhaust port 1065, depending upon the position of the spool assembly 1005 within the spool chamber 1050 (i.e., the internal valve space 1017 of the slide valve 1015 may align with the outlet 1061 of the housing vent 1060 and exhaust port 1065 when slide valve 1015 is at its first position). Although FIG. 5 shows all the seals 1090, 1091, 1092 located on the spool assembly 1000, the seals may be disposed both within the spool assembly and/or spool housing.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A reciprocating drive mechanism, comprising:
   a spool assembly; and
   a spool housing;
   wherein said spool housing comprises a spool chamber;
   wherein said spool assembly is disposed in and reciprocally movable within said spool chamber;
   wherein said spool housing comprises a first seal, a second seal, and a third seal;
   wherein, when said spool assembly is disposed within said spool chamber of said spool housing, said first seal, said second seal, and said third seal divide said spool chamber into a distal chamber, an intermediate chamber, a supply chamber, and a proximal chamber, respectively, such that:
   (i) said first seal divides said spool chamber into said distal chamber and said intermediate chamber;
   (ii) said second seal divides said spool chamber into said intermediate chamber and said supply chamber; and
   (iii) said third seal divides said spool chamber into said supply chamber and said proximal chamber;
   wherein said spool assembly comprises a first spool vent;
   wherein said first spool vent is in fluid communication with said distal chamber;
   wherein said spool housing comprises a first housing vent having an inlet and an outlet;
   wherein an inlet of said first housing vent is in fluid communication with said intermediate chamber; and
   wherein said first spool vent is in fluid communication with said first housing vent when said spool assembly reciprocates within said spool housing and aligns an outlet of said first spool vent within said intermediate chamber, such that a fluid trapped within said distal chamber is allowed to escape said distal chamber and into said intermediate chamber to said first housing vent.

2. The reciprocating drive mechanism of claim 1, wherein said spool housing further comprises a first exhaust port;
wherein said spool assembly further comprises a first slide valve;
wherein said first slide valve is coupled to an outer perimeter of said spool assembly;
wherein said first exhaust port is positioned proximally and adjacent to said outlet of said first housing vent;
wherein, as said spool assembly moves towards a distal end of said spool housing during an upstroke, a first internal valve space of said first slide valve aligns with an outlet of said first housing vent and said first exhaust port so as to allow said fluid within said first housing vent to communicate through said first internal valve space of said first slide valve and said first exhaust port; and
wherein, as said spool assembly moves towards a proximal end of said spool housing during a downstroke, at least a portion of said first slide valve blocks said outlet of said first housing vent so as to prevent said fluid within said first housing vent to communicate through said first internal valve space of said first slide valve and said first exhaust port.

3. The reciprocating drive mechanism of claim 2, wherein said spool housing further comprises a second housing vent;
wherein said second housing vent is proximal and adjacent to said first exhaust port and comprises an inlet and an outlet;
wherein said inlet of said second housing vent is in fluid communication with said proximal chamber and wherein said outlet of said second housing vent is in fluid communication with said supply chamber;
wherein, as said spool assembly moves towards said distal end of said spool housing during an upstroke, said outlet of said second housing vent is in fluid communication with said supply chamber, such that said proximal chamber is in fluid communication with said supply chamber; and
wherein, as said spool assembly moves towards said proximal end of said spool housing during a downstroke, said first internal valve space of said first slide valve aligns with said outlet of said second housing vent and said first exhaust port, so as to allow said fluid within said second housing vent and said proximal chamber to communicate through said first internal valve space of said first slide valve and said first exhaust port.

4. The reciprocating drive mechanism of claim 3, wherein said spool housing further comprises: a first fluid port, a second fluid port, and a second exhaust port;
wherein said second exhaust port is positioned proximally and adjacent to said first fluid port;
wherein said second fluid port is positioned proximally and adjacent to said second exhaust port;
wherein said first fluid port and said second fluid port are in fluid communication with said supply chamber;
wherein said spool assembly comprises a second slide valve coupled to an outer perimeter of said spool assembly;
wherein, as said spool assembly moves towards said distal end of said spool housing during said upstroke:
(i) a second internal valve space of said second slide valve aligns with said first fluid port and said second exhaust port so as to allow said fluid within said first fluid port to communicate through said second internal valve space of said second slide valve and through said second exhaust port; and
(ii) said second fluid port is in fluid communication with said supply chamber, so as to prevent said fluid in said second fluid port to communicate through said second internal valve space and said second exhaust port;
wherein, as said spool assembly moves towards said proximal end of said spool housing during said downstroke:
(i) said second internal valve space of said second slide valve aligns with said second fluid port and said second exhaust port so as to allow said fluid within said second fluid port to communicate through said second internal valve space of said second slide valve and through said second exhaust port; and
(ii) said first fluid port is in fluid communication with said supply chamber, so as to prevent said fluid in said first fluid port to communicate through said second internal valve space and said second exhaust port.

5. The reciprocating drive mechanism of claim 4, wherein said spool assembly comprises a center bore;
wherein said center bore of said spool assembly is in fluid communication with said distal chamber;
wherein, when a pressurized fluid travels from said center bore and towards said distal chamber, said spool assembly performs said downstroke.

6. The reciprocating drive mechanism of claim 5, further comprising:
a piston housing;
a piston; and
a valve stem;
wherein said piston housing comprises a top flange, a bottom flange, and a cylindrical side wall;
wherein said top flange, said bottom flange, and said cylindrical side wall form a piston chamber;
wherein said piston is reciprocally movable within said piston chamber and divides said piston chamber into a first cylindrical space and a second cylindrical space;
wherein a proximal portion of said valve stem is connected to said piston;
wherein a distal portion of said valve stem is configured to slideably and reciprocally engage within said center bore of said spool assembly;
wherein said valve stem comprises a valve stem bore and at least one passage;
wherein said valve stem bore and said at least one passage are in fluid communication with said center bore of said spool assembly, such that said valve stem bore and said at least one passage are in fluid communication with said distal chamber;
wherein said top flange comprises a valve stem opening and a fourth seal disposed within said valve stem opening;
wherein said fourth seal is slideably engaged with said valve stem; and
wherein, when said at least one passage is exposed within said first cylindrical space after said piston moves towards said bottom flange and shifts said at least one passage of said valve stem within said first cylindrical space, said valve stem bore is in fluid communication with said first cylindrical space.

7. The reciprocating drive mechanism of claim 6, further comprising:

a first fluid conduit; and
a second fluid conduit;
wherein said first fluid conduit is coupled between said first fluid port and said bottom flange of said piston housing
wherein said first fluid conduit allows said first fluid port to be in fluid communication with said first cylindrical space;
wherein said second fluid conduit is coupled between said second fluid port and said top flange of said piston housing; and
wherein said second fluid conduit allows said second fluid port to be in fluid communication with said second cylindrical space.

8. The reciprocating drive mechanism of claim 1, wherein said spool assembly comprises a second spool vent having an inlet and an outlet;
wherein an inlet of said second spool vent is in fluid communication with said distal chamber;
wherein said outlet of said second spool vent is located at an outer perimeter of said spool assembly;
wherein an outlet of said second spool vent is configured to be in fluid communication with said first housing vent when said spool assembly reciprocates within said spool housing and aligns said outlet of said first spool vent within said intermediate chamber, such that a fluid trapped within said distal chamber is allowed to escape said distal chamber and into said intermediate chamber to said first housing vent via said second spool vent.

9. The reciprocating drive mechanism of claim 1, wherein said fluid is a gas.

10. A reciprocating drive mechanism, comprising:
a spool assembly; and
a spool housing;
wherein said spool housing comprises a spool chamber;
wherein said spool assembly is disposed in and reciprocally movable within said spool chamber;
wherein said spool housing comprises a first seal, a second seal, and a third seal;
wherein, when said spool assembly is disposed within said spool chamber of said spool housing, said first seal, said second seal, and said third seal divide said spool chamber into a distal chamber, an intermediate chamber, a supply chamber, and a proximal chamber, respectively, such that:
(i) said first seal divides said spool chamber into said distal chamber and said intermediate chamber;
(ii) said second seal divides said spool chamber into said intermediate chamber and said supply chamber; and
(iii) said third seal divides said spool chamber into said supply chamber and said proximal chamber;
wherein said spool assembly comprises a first spool vent having an inlet and an outlet;
wherein said inlet of said first spool vent is in fluid communication with said distal chamber and wherein said outlet of said first spool vent is located at an outer perimeter of said spool assembly;
wherein said spool housing comprises a first housing vent having an inlet and an outlet;
wherein an inlet of said first housing vent in fluid communication with said intermediate chamber and wherein said outlet of said first housing vent is in fluid communication with said supply chamber; and
wherein said first spool vent is in fluid communication with said first housing vent when said spool assembly reciprocates within said spool housing and aligns said outlet of said first spool vent within said intermediate chamber, such that a fluid trapped within said distal chamber is allowed to escape said distal chamber and into said intermediate chamber to said first housing vent.

11. The reciprocating drive mechanism of claim 10, wherein said spool housing further comprises a first exhaust port;
wherein said spool assembly further comprises a first slide valve;
wherein said first slide valve is coupled to an outer perimeter of said spool assembly;
wherein said first exhaust port is positioned proximally and adjacent to said outlet of said first housing vent;
wherein, as said spool assembly moves towards a distal end of said spool housing during an upstroke, a first internal valve space of said first slide valve aligns with an outlet of said first housing vent and said first exhaust port so as to allow said fluid within said first housing vent to communicate through said first internal valve space of said first slide valve and said first exhaust port; and
wherein, as said spool assembly moves towards a proximal end of said spool housing during a downstroke, at least a portion of said first slide valve blocks said outlet of said first housing vent so as to prevent said fluid within said first housing vent to communicate through said first internal valve space of said first slide valve and said first exhaust port.

12. The reciprocating drive mechanism of claim 11, wherein said spool housing further comprises a second housing vent;
wherein said second housing vent is proximal and adjacent to said first exhaust port and comprises an inlet and an outlet;
wherein said inlet of said second housing vent is in fluid communication with said proximal chamber and wherein said outlet of said second housing vent is in fluid communication with said supply chamber;
wherein, as said spool assembly moves towards said distal end of said spool housing during an upstroke, said outlet of said second housing vent is in fluid communication with said supply chamber, such that said proximal chamber is in fluid communication with said supply chamber; and
wherein, as said spool assembly moves towards said proximal end of said spool housing during a downstroke, said first internal valve space of said first slide valve aligns with said outlet of said second housing vent and said first exhaust port, so as to allow said fluid within said second housing vent and said proximal chamber to communicate through said first internal valve space of said first slide valve and said first exhaust port.

13. The reciprocating drive mechanism of claim 12, wherein said spool housing further comprises: a first fluid port, a second fluid port, and a second exhaust port;
wherein said second exhaust port is positioned proximally and adjacent to said first fluid port;
wherein said second fluid port is positioned proximally and adjacent to said second exhaust port;
wherein said first fluid port and said second fluid port are in fluid communication with said supply chamber;
wherein said spool assembly comprises a second slide valve coupled to an outer perimeter of said spool assembly;

wherein, as said spool assembly moves towards said distal end of said spool housing during said upstroke:
(i) a second internal valve space of said second slide valve aligns with said first fluid port and said second exhaust port so as to allow said fluid within said first fluid port to communicate through said second internal valve space of said second slide valve and to said second exhaust port; and
(ii) said second fluid port is in fluid communication with said supply chamber, so as to prevent said fluid in said second fluid port to communicate through said second internal valve space and said second exhaust port;
wherein, as said spool assembly moves towards said proximal end of said spool housing during said downstroke:
(i) said second internal valve space of said second slide valve aligns with said second fluid port and said second exhaust port so as to allow said fluid within said second fluid port to communicate through said second internal valve space of said second slide valve and to said second exhaust port; and
(ii) said first fluid port is in fluid communication with said supply chamber, so as to prevent said fluid in said first fluid port to communicate through said second internal valve space and said second exhaust port.

14. The reciprocating drive mechanism of claim 13, wherein said spool assembly comprises a center bore;
wherein said center bore of said spool assembly is in fluid communication with said distal chamber;
wherein, when a pressurized fluid travels from said center bore and towards said distal chamber, said spool assembly performs said downstroke.

15. The reciprocating drive mechanism of claim 14, further comprising:
a piston housing;
a piston; and
a valve stem;
wherein said piston housing comprises a top flange, a bottom flange, and a cylindrical side wall;
wherein said top flange, said bottom flange, and said cylindrical side wall form a piston chamber;
wherein said piston is reciprocally movable within said piston chamber and divides said piston chamber into a first cylindrical space and a second cylindrical space;
wherein a proximal portion of said valve stem is connected to said piston;
wherein a distal portion of said valve stem is configured to slideably and reciprocally engage within said center bore of said spool assembly;
wherein said valve stem comprises a valve stem bore and at least one passage;
wherein said valve stem bore and said at least one passage are in fluid communication with said center bore of said spool assembly, such that said valve stem bore and said at least one passage of said valve stem are in fluid communication with said distal chamber;
wherein said top flange comprises a valve stem opening and a fourth seal disposed within said valve stem opening;
wherein said fourth seal is slideably engaged with said valve stem; and
wherein, when said at least one passage is exposed within said first cylindrical space after said piston moves towards said bottom flange and shifts said at least one passage of said valve stem within said first cylindrical space, said valve stem bore of said valve stem is in fluid communication with said first cylindrical space.

16. The reciprocating drive mechanism of claim 15, further comprising:
a first fluid conduit; and
a second fluid conduit;
wherein said first fluid conduit is coupled between said first fluid port and said bottom flange of said piston housing
wherein said first fluid conduit allows said first fluid port to be in fluid communication with said first cylindrical space;
wherein said second fluid conduit is coupled between said second fluid port and said top flange of said piston housing; and
wherein said second fluid conduit allows said second fluid port to be in fluid communication with said second cylindrical space.

17. The reciprocating drive mechanism of claim 16, wherein said spool assembly comprises a second spool vent having an inlet and an outlet;
wherein an inlet of said second spool vent is in fluid communication with said distal chamber;
wherein said outlet of said second spool vent is located at an outer perimeter of said spool assembly;
wherein an outlet of said second spool vent is configured to be in fluid communication with said first housing vent when said spool assembly reciprocates within said spool housing and aligns said outlet of said second spool vent within said intermediate chamber, such that a fluid trapped within said distal chamber is allowed to escape said distal chamber and into said intermediate chamber to said first housing vent via said second spool vent.

18. The reciprocating drive mechanism of claim 17, wherein said spool assembly comprises a second spool vent having an inlet and an outlet;
wherein an inlet of said second spool vent is in fluid communication with said distal chamber;
wherein an outlet of said second spool vent is located at an outer perimeter of said spool assembly; and
wherein an outlet of said second spool vent is configured to be in fluid communication with said first housing vent when said spool assembly reciprocates within said spool housing and aligns said outlet of said first spool vent within said intermediate chamber, such that a fluid trapped within said distal chamber is allowed to escape said distal chamber and into said intermediate chamber to said first housing vent via said second spool vent.

19. A reciprocating drive mechanism, comprising:
a spool assembly;
a spool housing;
a piston housing;
a piston;
a valve stem;
a first fluid conduit; and
a second fluid conduit;
wherein said spool assembly comprises: a first seal, a second seal, a third seal, a first spool vent and first slide valve;
wherein said spool housing comprises: a spool chamber, a first exhaust port, a second exhaust port, a first fluid port, and a second fluid port;
wherein said spool assembly is disposed in and reciprocally movable within said spool chamber;
wherein, when said spool assembly is disposed within said spool chamber of said spool housing, said first seal, said second seal, and said third seal divide said spool chamber into a distal chamber, an intermediate chamber, a supply chamber, and a proximal chamber, respectively, such that:
  (i) said first seal divides said spool chamber into said distal chamber and said intermediate chamber;
  (ii) said second seal divides said spool chamber into said intermediate chamber and said supply chamber; and
  (iii) said third seal divides said spool chamber into said supply chamber and said proximal chamber;
wherein said first spool vent comprises an inlet and an outlet;
wherein said inlet of said first spool vent is in fluid communication with said distal chamber;
wherein said outlet of said first spool vent is located at an outer perimeter of said spool assembly and is in fluid communication with said intermediate chamber;
wherein said spool housing comprises a first housing vent having an inlet and an outlet;
wherein an inlet of said first housing vent is in fluid communication with said intermediate chamber when said inlet of said first housing vent aligns with said intermediate chamber;
wherein said outlet of said first housing vent is in fluid communication with said supply chamber;
wherein said first spool vent is in fluid communication with said first housing vent when said spool assembly reciprocates within said spool housing and aligns said inlet of said first housing vent within said intermediate chamber, such that a fluid trapped within said distal chamber is allowed to escape said distal chamber, through said spool vent, through said intermediate chamber, and to said first housing vent;
wherein said first exhaust port is positioned proximally and adjacent to said outlet of said first housing vent;
wherein said second housing vent is proximal and adjacent to said first exhaust port and comprises an inlet and an outlet;
wherein said inlet of said second housing vent is in fluid communication with said proximal chamber and wherein said outlet of said second housing vent is in fluid communication with said supply chamber;
wherein, as said spool assembly moves towards a distal end of said spool housing during an upstroke:
  (i) said outlet of said second housing vent is in fluid communication with said supply chamber, such that said proximal chamber is in fluid communication with said supply chamber; and
  (ii) a first internal valve space of said first slide valve aligns with an outlet of said first housing vent and said first exhaust port so as to allow said fluid within said first housing vent to communicate through said internal valve space of said first slide valve and said first exhaust port;
wherein, as said spool assembly moves towards a proximal end of said spool housing during a downstroke:
  (i) said first internal valve space of said first slide valve aligns with said outlet of said second housing vent and said first exhaust port, so as to allow said fluid within said second housing vent and said proximal chamber to communicate through said first internal valve space of said first slide valve and said first exhaust port; and
  (ii) at least a portion of said first slide valve blocks said outlet of said first housing vent so as to prevent said fluid within said first housing vent to communicate through said first internal valve space of said first slide valve and said first exhaust port;
wherein said second exhaust port is positioned proximally and adjacent to said first fluid port;
wherein said second fluid port is positioned proximally and adjacent to said second exhaust port;
wherein said first fluid port and said second fluid port are in fluid communication with said supply chamber;
wherein said spool assembly comprises a second slide valve coupled to an outer perimeter of said spool assembly;
wherein, as said spool assembly moves towards said distal end of said spool housing during said upstroke:
  (i) a second internal valve space of said second slide valve aligns with said first fluid port and said second exhaust port so as to allow said fluid within said first fluid port to communicate through said second internal valve space of said second slide valve and to said second exhaust port; and
  (ii) said second fluid port is in fluid communication with said supply chamber, so as to prevent said fluid in said second fluid port to communicate through said second internal valve space and said second exhaust port;
wherein, as said spool assembly moves towards said proximal end of said spool housing during said downstroke:
  (i) a second internal valve space of said second slide valve aligns with said second fluid port and said second exhaust port so as to allow said fluid within said second fluid port to communicate through said second internal valve space of said second slide valve and to said second exhaust port; and
  (ii) said first fluid port is in fluid communication with said supply chamber, so as to prevent said fluid in said first fluid port to communicate through said second internal valve space and said second exhaust port;
wherein said piston housing comprises a top flange, a bottom flange, and a cylindrical side wall;
wherein said top flange, said bottom flange, and said cylindrical side walls form a piston chamber;
wherein said piston is reciprocally movable within said piston chamber and divides said piston chamber into a first cylindrical space and a second cylindrical space;
wherein a proximal portion of said valve stem is connected to said piston;
wherein a distal portion of said valve stem is configured to slideably and reciprocally engage within a center bore of said spool assembly;
wherein said center bore of said spool assembly is in fluid communication with said distal chamber of said spool housing;
wherein, when a pressurized fluid travels from said center bore and towards said distal chamber, said spool assembly performs said downstroke;
wherein said valve stem comprises a valve stem bore and at least one passage;
wherein said valve stem bore and said at least one passage are in fluid communication with said center bore of said spool assembly, such that said valve stem bore and said at least one passage of said valve stem are in fluid communication with said distal chamber;
wherein said top flange comprises a valve stem opening and a fourth seal disposed within said valve stem opening;

wherein said fourth seal is slideably engaged with said valve stem;

wherein, when said at least one passage is exposed within said first cylindrical space after said piston moves towards said bottom flange and shifts said at least one passage of said valve stem within said first cylindrical space, said valve stem bore of said valve stem is in fluid communication with said first cylindrical space;

wherein said first fluid conduit is coupled between said first fluid port and said bottom flange of said piston housing;

wherein said first fluid conduit allows said first fluid port to be in fluid communication with said first cylindrical space;

wherein said second fluid conduit is coupled between said second fluid port and said top flange of said piston housing; and wherein said second fluid conduit allows said second fluid port to be in fluid communication with said second cylindrical space.

20. The reciprocating drive mechanism of claim 19, wherein said spool assembly comprises a second spool vent having an inlet and an outlet;

wherein an inlet of said second spool vent is in fluid communication with said distal chamber;

wherein an outlet of said second spool vent is located at an outer perimeter of said spool assembly and is in fluid communication with said intermediate chamber; and wherein an outlet of said second spool vent is configured to be in fluid communication with said first housing vent when said spool assembly reciprocates within said spool housing and aligns said inlet of said first housing vent within said intermediate chamber, such that a fluid trapped within said distal chamber is allowed to escape said distal chamber and into said intermediate chamber to said first housing vent via said second spool vent.

* * * * *